US011745997B2

(12) United States Patent
Sanchez et al.

(10) Patent No.: US 11,745,997 B2
(45) Date of Patent: Sep. 5, 2023

(54) METHOD AND APPARATUS FOR COOLING A DISPENSING STATION

(71) Applicant: LANCER CORPORATION, San Antonio, TX (US)

(72) Inventors: Adan Sanchez, Seguin, TX (US); Mel Kyees, New Braunfels, TX (US); Marcus Buscemi, Brooksville, FL (US)

(73) Assignee: Lancer Corporation, San Antonio, TX (US)

( * ) Notice: Subject to any disclaimer, the term of this patent is extended or adjusted under 35 U.S.C. 154(b) by 218 days.

(21) Appl. No.: 17/197,452

(22) Filed: Mar. 10, 2021

(65) Prior Publication Data

US 2021/0284521 A1    Sep. 16, 2021

Related U.S. Application Data

(60) Provisional application No. 62/989,266, filed on Mar. 13, 2020.

(51) Int. Cl.
*B67D 1/00* (2006.01)
*B67D 1/08* (2006.01)
(Continued)

(52) U.S. Cl.
CPC ......... *B67D 1/0862* (2013.01); *B67D 1/0867* (2013.01); *F16L 41/00* (2013.01);
(Continued)

(58) Field of Classification Search
CPC .......... F25D 31/002; F16L 41/00; B67D 1/08; B67D 1/0054; B67D 1/0862; B67D 1/0867; B67D 1/06; B67D 2210/0006
(Continued)

(56) References Cited

U.S. PATENT DOCUMENTS 2,194,319 A * 3/1940 Panagopoulos .......... B67D 1/04
62/393
2,327,910 A * 8/1943 Levine .................. F25D 31/002
62/390
(Continued)

OTHER PUBLICATIONS

International Search Report and Written Opinion for PCT/US2021/021659, dated May 27, 2021, PCT Application Counterpart to U.S. Appl. No. 17/197,452.

*Primary Examiner* — Charles P. Cheyney
(74) *Attorney, Agent, or Firm* — Christopher L. Makay

(57) ABSTRACT

A cooling system for a dispensing station includes a modular manifold that incorporates into the dispensing station. The modular manifold includes a recirculation block, an interface block, one or more expander blocks, and one or more spacer blocks that interconnect to produce the modular manifold. The modular manifold includes a recirculation line that couples at an inlet with a cooling fluid system to receive a cooling fluid therein and at an outlet with the cooling fluid system to deliver the cooling fluid from the modular manifold to the cooling fluid system. The modular manifold couples with a drink source and with a drink outlet of the dispensing station such that a drink flowing through the modular manifold from the drink source transfers heat to the cooling fluid circulating through the recirculation line resulting in a chilling of the drink prior to a dispensing thereof from the drink outlet.

31 Claims, 17 Drawing Sheets

(51) Int. Cl.
    *F25D 31/00*     (2006.01)
    *F16L 41/00*     (2006.01)
    *B67D 1/06*     (2006.01)

(52) U.S. Cl.
    CPC .............. *F25D 31/002* (2013.01); *B67D 1/06* (2013.01); *B67D 2210/0006* (2013.01)

(58) Field of Classification Search
    USPC .......................................... 222/129.1, 146.1
    See application file for complete search history.

(56) References Cited

U.S. PATENT DOCUMENTS

| | | | | |
|---|---|---|---|---|
| 3,347,421 | A * | 10/1967 | Yingst | B67D 1/0036 |
| | | | | 261/DIG. 7 |
| 4,676,400 | A * | 6/1987 | Lamont | B67D 1/0867 |
| | | | | 222/146.6 |
| 5,228,312 | A * | 7/1993 | Williams | B67D 1/0862 |
| | | | | 62/390 |
| 6,286,721 | B1 * | 9/2001 | Pellegrini | B67D 1/08 |
| | | | | 137/340 |
| 6,446,458 | B1 | 9/2002 | Klepach | |
| 6,598,417 | B1 * | 7/2003 | Wilkes | F25D 17/02 |
| | | | | 62/390 |
| 7,287,671 | B2 | 10/2007 | Morrow, Sr. et al. | |
| 2002/0084284 | A1 * | 7/2002 | Landers | B67D 1/0044 |
| | | | | 222/129.1 |
| 2006/0042706 | A1 | 3/2006 | Perry et al. | |

\* cited by examiner

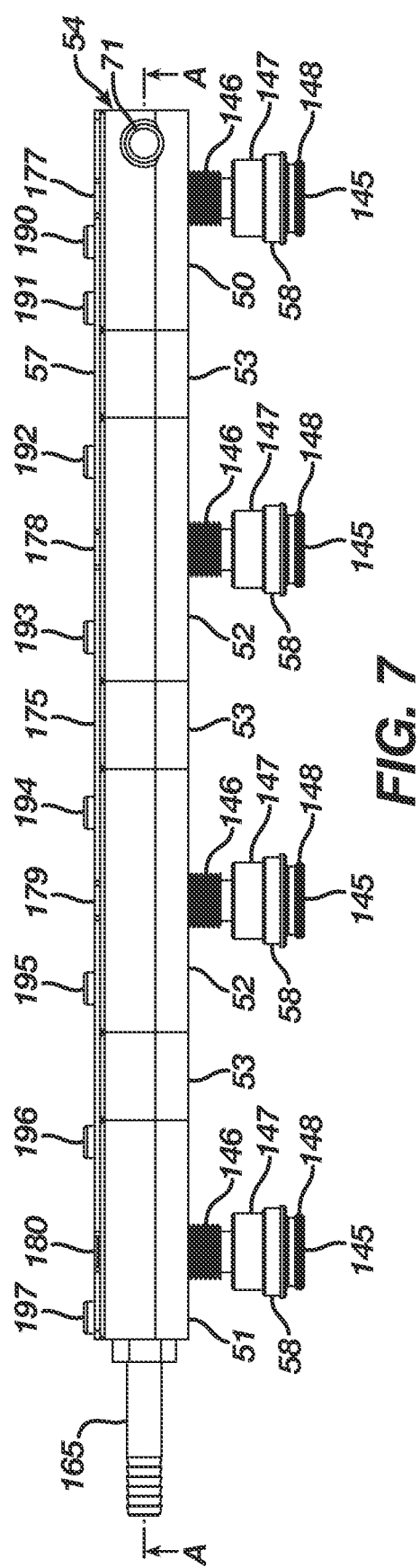
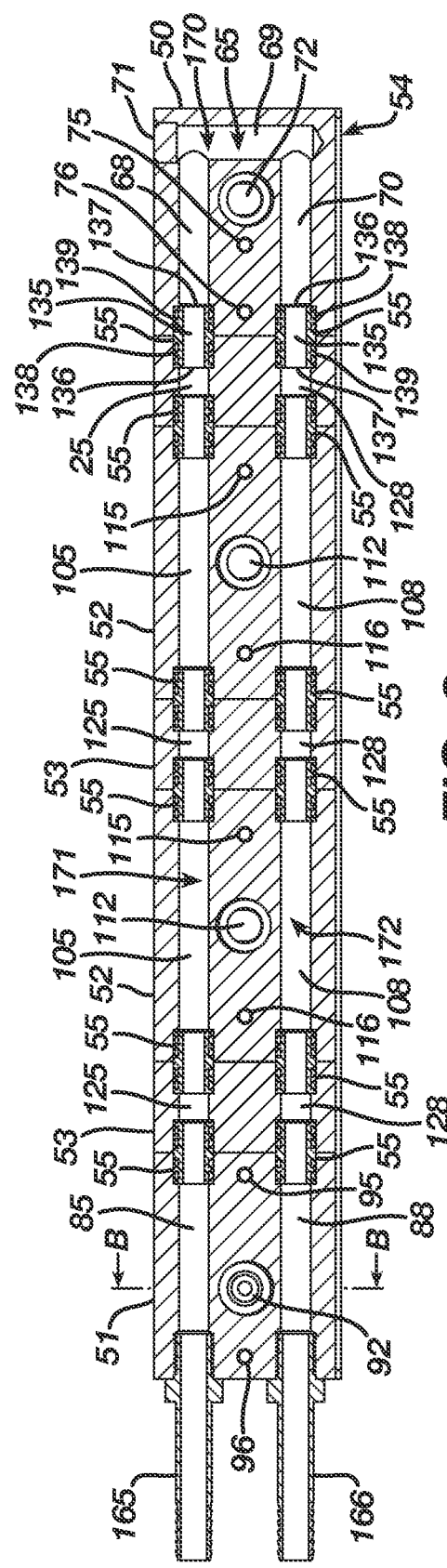
FIG. 7
FIG. 8

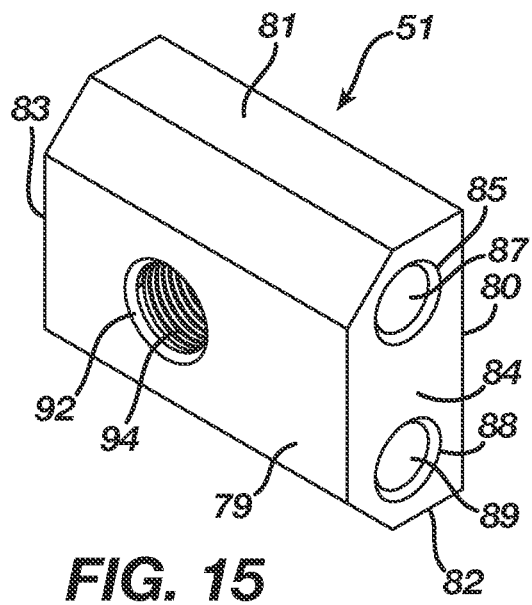
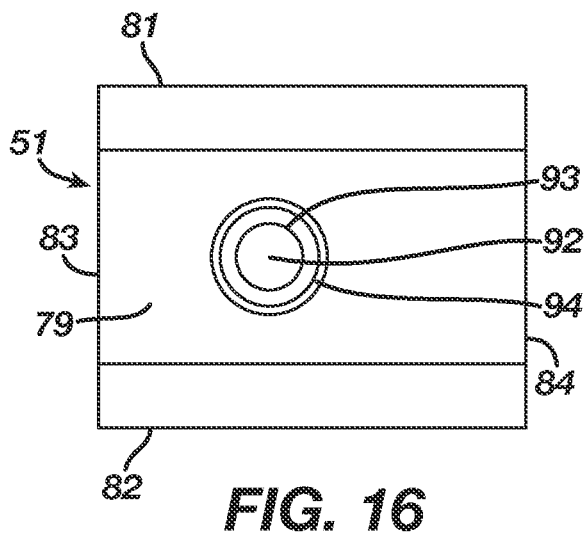
FIG. 15
FIG. 16
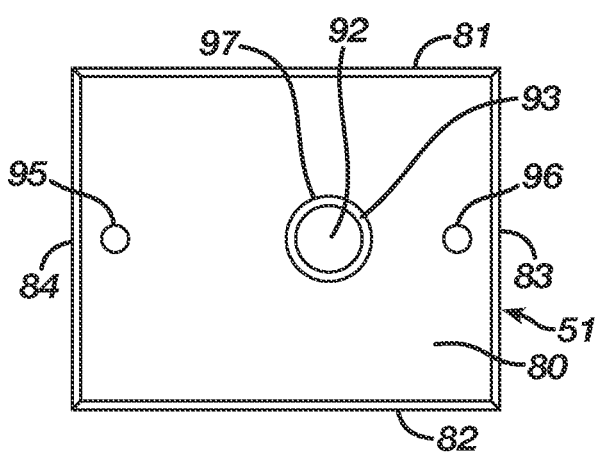
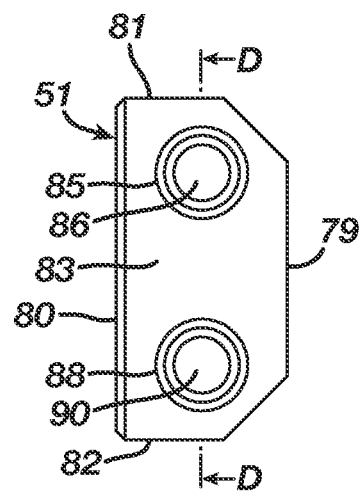
FIG. 17
FIG. 18
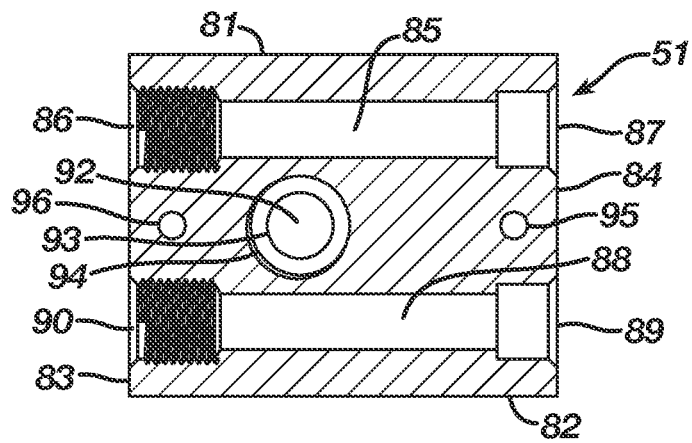
FIG. 19

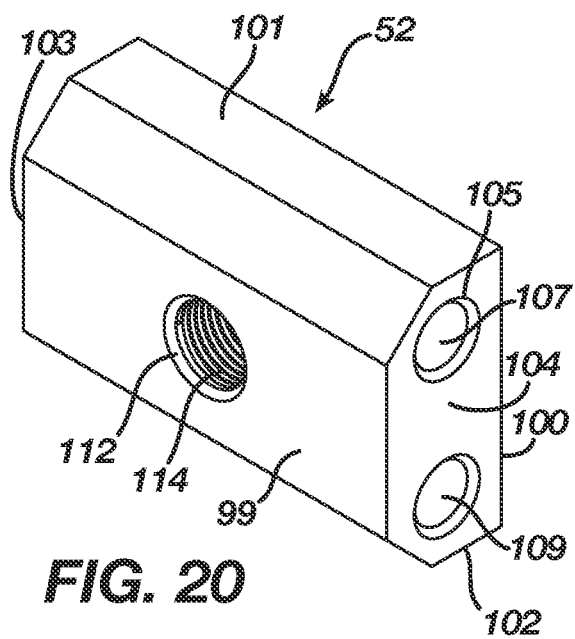
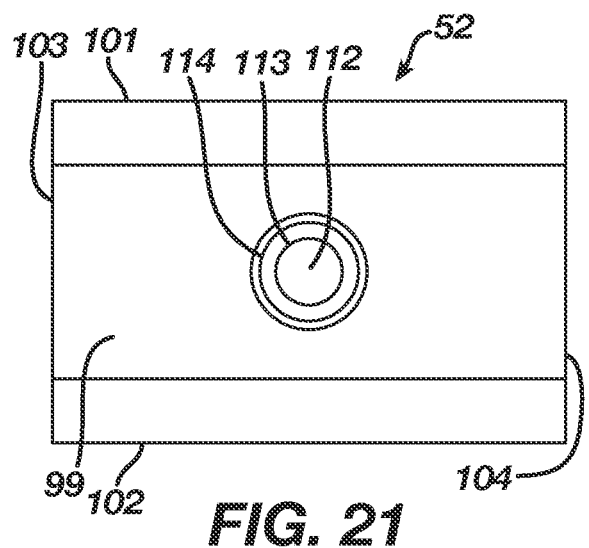
FIG. 20
FIG. 21
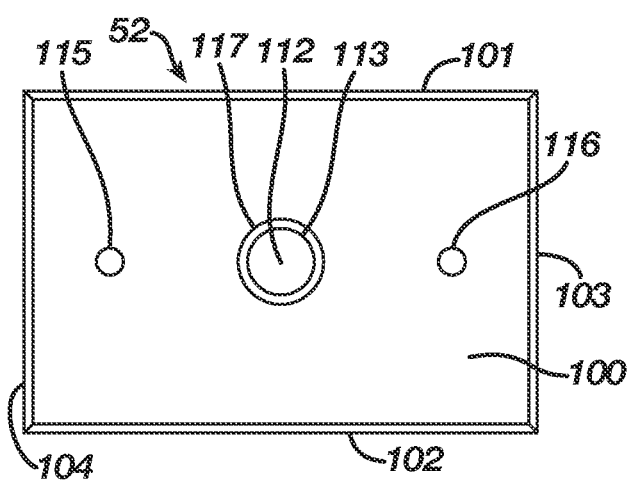
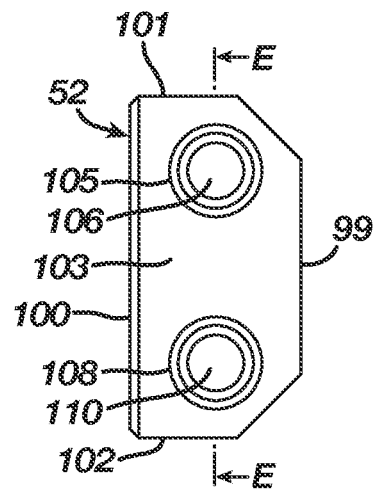
FIG. 22
FIG. 23
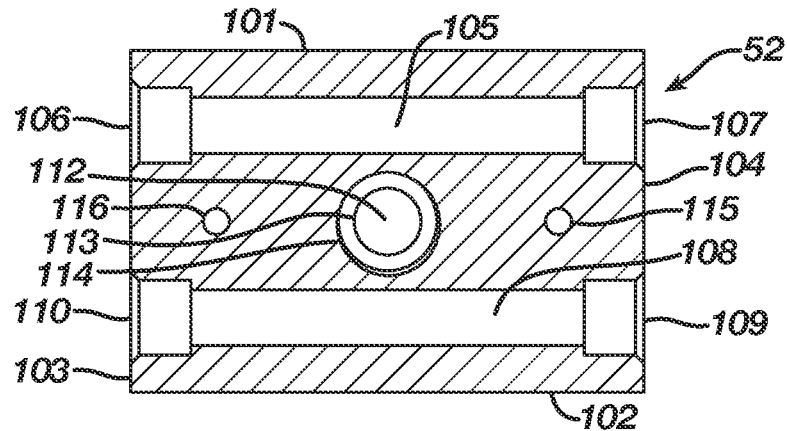
FIG. 24

METHOD AND APPARATUS FOR COOLING A DISPENSING STATION

BACKGROUND OF THE INVENTION

1. Field of the Invention

The present invention relates to drink dispensing, primarily beer dispensing, and, more particularly, but not by way of limitation, to a cooling system for a dispensing station that primarily dispenses beer, whereby the cooling system provides modular implementation of the dispensing station.

2. Description of the Related Art

The delivery of a drink such as beer often involves use of a dispensing tower disposed on a countertop or cabinet. The dispensing tower supports one or more beer taps remotely, fluidly connected via one or more beer delivery lines with a beer source such as one or more beer kegs. In order to maintain dispensed beer at a desired temperature, the one or more beer kegs typically are stored in a walk-in cooler. Additional maintenance of dispensed beer at the desired temperature includes use of a glycol chiller system, typically located in the walk-in cooler, that delivers a chilled glycol/water mixture to the dispensing tower. The dispensing tower includes a chamber connected in a fluid circuit with the glycol chiller system such that the glycol chiller system flows the chilled glycol/water mixture through the chamber. The one or more beer delivery lines pass through the chamber prior to connecting with the one or more beer taps whereby the chilled glycol/water mixture flowing through the chamber absorbs heat from the beer resulting in the beer dispensed from the dispensing tower maintaining the desired dispensing temperature. Although the chilled glycol/water mixture filled chamber assists in maintaining a desired beer temperature, flooding the dispensing tower with the chilled glycol/water mixture increases dispensing tower costs and precludes a modular implementation of the dispensing tower because dispensing towers with differing numbers of beer taps each requires a separate manufacturing process.

An alternative to the chamber in the dispensing tower includes a chiller line disposed in the dispensing tower and connected in a fluid circuit with the glycol chiller system such that the glycol chiller system flows the chilled glycol/water mixture through the chiller line. The chiller line resides proximate to or in direct contact with the one or more beer delivery lines passing through the dispensing tower prior to their connecting with the one or more beer taps whereby the chilled glycol/water mixture flowing through the chiller line absorbs heat from the beer resulting in the beer dispensed from the dispensing tower maintaining the desired dispensing temperature. Although the chiller line assists in maintaining a desired beer temperature while eliminating the dispensing tower chamber, thereby reducing the size and thus the cost of the glycol chiller system, the chiller line also precludes a modular implementation of the dispensing tower because dispensing towers with differing numbers of beer taps each requires a separate manufacturing process.

Accordingly, a method and apparatus for cooling a dispensing station that assists in maintaining dispensed drink, primarily beer, at a desired dispensing temperature while allowing a modular implementation of the dispensing station will provide an improvement in drink dispensing.

SUMMARY OF THE INVENTION

In accordance with the present invention, a cooling system for a dispensing station includes a modular manifold configured for incorporation into the dispensing station. The modular manifold includes at least a recirculation block and an interface block, one or more expander blocks, and one or more spacer blocks that interconnect using a plurality of coupling tubes to produce the modular manifold. The recirculation block, the interface block, the one or more expander blocks, and the one or more spacer blocks interconnect such that the modular manifold includes therein a recirculation line. The recirculation line couples with a cooling fluid feed line to receive into the modular manifold a cooling fluid from a cooling fluid system. The recirculation line further couples with a cooling fluid return line to deliver the cooling fluid from the modular manifold to the cooling fluid system. The modular manifold couples with at least a first drink source and with at least a first drink outlet of the dispensing station such that a first drink flowing through the modular manifold from the first drink source transfers heat to the cooling fluid circulating through the recirculation line resulting in a chilling of the first drink prior to a dispensing thereof from the first drink outlet. In a preferred embodiment, the modular manifold couples with multiple drink sources and multiple drink outlets of the dispensing station such that multiple drinks flowing through the modular manifold from the multiple drink sources transfer heat to the cooling fluid circulating through the recirculation line resulting in a chilling of the multiple drinks prior to a dispensing thereof from the multiple drink outlets.

The recirculation block includes an aperture therethrough having an inlet segment and an outlet segment. The recirculation block further includes a recirculation conduit having an inlet and an outlet. The recirculation conduit receives the cooling fluid from the cooling fluid system at the inlet, circulates the cooling fluid through the recirculation block while reversing the cooling fluid, and delivers the cooling fluid at its outlet for return to the cooling fluid system.

An outlet fitting inserts into the aperture of the recirculation block at its outlet segment and couples with one of the multiple drink outlets of the dispensing station such as the first drink outlet. An inlet fitting inserts into the aperture of the recirculation block at its inlet segment such that the inlet fitting communicates with the outlet fitting. The inlet fitting couples one of the multiple drink sources such as the first drink source in order for a first drink flowing through the inlet fitting and the outlet fitting from the first drink source to transfer heat to the cooling fluid circulating through the recirculation conduit resulting in a chilling of the first drink prior to a dispensing thereof from the first drink outlet.

The recirculation block incorporates into the dispensing station while further being coupled with the cooling fluid system. More particularly, the recirculation conduit at its inlet couples with the cooling fluid feed line to receive into the recirculation block the cooling fluid from a cooling fluid system. The recirculation conduit at its outlet further couples with the cooling fluid return line to deliver the cooling fluid from the recirculation block to the cooling fluid system. Alternatively, the recirculation block, as described herein, interconnects with at least the interface block and the one or more expander blocks and the one or more spacer blocks in order to produce the modular manifold.

The interface block interconnects with the recirculation block using a first coupling tube and a second coupling tube of the plurality of coupling tubes to produce the modular manifold. The interface block includes an aperture therethrough having an inlet segment and an outlet segment. The interface block further includes a feed conduit therethrough having an inlet configured to couple the feed conduit with cooling fluid feed line to deliver the cooling fluid into the feed conduit and an outlet. The interface block still further includes a return conduit therethrough having an inlet and an outlet configured to couple the return conduit with the cooling fluid return line to deliver the cooling fluid thereto.

The first coupling tube inserts into the outlet of the feed conduit for the interface block and the inlet of the recirculation conduit for the recirculation block. The second coupling tube inserts into the inlet of the return conduit for the interface block and the outlet of the recirculation conduit for the recirculation block. The first and second coupling tubes interconnect the interface block with the recirculation block in order for the interface block and the recirculation block to form the recirculation line that circulates the cooling fluid through the modular manifold. More particularly, the outlet of the feed conduit of the interface block aligns with the inlet of the recirculation conduit of the recirculation block and the outlet of the recirculation conduit of the recirculation block aligns with the inlet of the return conduit of the interface block. As a result, the feed conduit of the interface block delivers the cooling fluid from the cooling fluid system into the recirculation conduit of the recirculation block. The recirculation conduit circulates the cooling fluid through the recirculation block while reversing the cooling fluid for delivery into the return conduit of the interface block and return to the cooling fluid system.

An outlet fitting inserts into the aperture of the interface block at its outlet segment and couples with one of the multiple drink outlets of the dispensing station such as a second drink outlet. An inlet fitting inserts into the aperture of the interface block at its inlet segment such that the inlet fitting communicates with the outlet fitting. The inlet fitting couples one of the multiple drink sources such as a second drink source in order for a second drink flowing through the inlet fitting and the outlet fitting from the second drink source to transfer heat to the cooling fluid circulating through the feed conduit and the return conduit of the interface block resulting in a chilling of the second drink prior to a dispensing thereof from the second drink outlet.

The expander block interconnects with the recirculation block and the interface block using the first coupling tube, the second coupling tube, a third coupling tube, and a fourth coupling tube of the plurality of coupling tubes to produce the modular manifold. The expander block includes an aperture therethrough having an inlet segment and an outlet segment. The expander block further includes a feed conduit therethrough having an inlet and an outlet. The expander block still further includes a return conduit therethrough having an inlet and an outlet.

The first coupling tube inserts into the outlet of the feed conduit of the expander block and the inlet of the recirculation conduit of the recirculation block. The second coupling tube inserts into the inlet of the return conduit of the expander block and the outlet of the recirculation conduit of the recirculation block. The third coupling tube inserts into the outlet of the feed conduit of the interface block and the inlet of the feed conduit of the expander block. The fourth coupling tube inserts into the inlet of the return conduit of the interface block and the outlet of the return conduit of the expander block. The first, second, third, and fourth coupling tubes interconnect the interface block, the expander block, and the recirculation block in order for the interface block, the expander block, and the recirculation block to form the recirculation line that circulates the cooling fluid through the modular manifold. More particularly, the feed conduits of the interface block and the expander block align with the recirculation conduit of the recirculation block at the inlet thereof. The return conduits of the interface block and the expander block align with the recirculation conduit of the recirculation block at the outlet thereof. As a result, the feed conduits of the interface block and the expander block receive the cooling fluid from the cooling fluid system and deliver the cooling fluid into the recirculation conduit of the recirculation block. The recirculation conduit circulates the cooling fluid through the recirculation block while reversing the cooling fluid for delivery to the return conduits of the interface block and the expander block and return to the cooling fluid system.

An outlet fitting inserts into the aperture of the expander block at its outlet segment and couples with one of the multiple drink outlets of the dispensing station such as a third drink outlet. An inlet fitting inserts into the aperture of the expander block at its inlet segment such that the inlet fitting communicates with the outlet fitting. The inlet fitting couples one of the multiple drink sources such as a third drink source in order for a third drink flowing through the inlet fitting and the outlet fitting from the third drink source to transfer heat to the cooling fluid circulating through the feed conduit and the return conduit of the expander block resulting in a chilling of the third drink prior to a dispensing thereof from the third drink outlet.

The spacer block interconnects with the recirculation block, the interface block, and the expander block using the first coupling tube, the second coupling tube, the third coupling tube, the fourth coupling tube, a fifth coupling tube, and a sixth coupling tube of the plurality of coupling tubes to produce the modular manifold. The spacer block includes a feed conduit therethrough having an inlet and an outlet. The spacer block further includes a return conduit therethrough having an inlet and an outlet.

The first coupling tube inserts into the outlet of the feed conduit of the spacer block and the inlet of the recirculation conduit of the recirculation block or the outlet of the feed conduit of the expander block and the inlet of the recirculation conduit of the recirculation block. The second coupling tube inserts into the inlet of the return conduit of the spacer block and the outlet of the recirculation conduit for the recirculation block or the inlet of the return conduit of the expander block and the outlet of the recirculation conduit of the recirculation block. The third coupling tube inserts into the outlet of the feed conduit of the expander block and the inlet of the feed conduit of the spacer block or the outlet of the feed conduit of the spacer block and the inlet of the feed conduit of the expander block. The fourth coupling tube inserts into the inlet of the return conduit of the expander block and the outlet of the return conduit of the spacer block or the inlet of the return conduit of the spacer block and the outlet of the return conduit of the expander block. The fifth coupling tube inserts into the outlet of the feed conduit of the interface block and the inlet of the feed conduit of the expander block or the outlet of the feed conduit of the interface block and the inlet of the feed conduit of the spacer block. The sixth coupling tube inserts into the inlet of the return conduit of the interface block and the outlet of the return conduit of the expander block or the inlet of the return conduit of the interface block and the outlet of the return conduit of the spacer block. The first, second, third, fourth, fifth, and sixth coupling tubes interconnect the interface block, the expander block, the spacer block, and the recirculation block in order for the interface block, the expander block, the spacer block, and the recirculation block to form the recirculation line that circulates the cooling fluid through the modular manifold. More particularly, the feed conduits of the interface block, the expander block, and spacer block align with the recirculation conduit of the recirculation block at the inlet thereof. The return conduits of the interface block, the expander block, and the spacer block align with the recirculation conduit of the recirculation block at the outlet thereof. As a result, the feed conduits of the interface block, the expander block, and spacer block align receive the cooling fluid from the cooling fluid system and deliver the cooling fluid into the recirculation conduit of the recirculation block. The recirculation conduit circulates the cooling fluid through the recirculation block while reversing the cooling fluid for delivery to the return conduits of the interface block, the expander block, and the spacer block and return to the cooling fluid system. Although the spacer block has been described as used in combination with the expander block, one of ordinary skill in the art will recognize that the spacer block may be used with the recirculation block and the recirculation block without the expander block.

In interconnecting the recirculation block, the interface block, the one or more expander blocks, and the one or more spacer blocks to produce the modular manifold including a recirculation line, the feed conduits of the interface block, the one or more expander blocks, and the one or more spacer blocks align to form a feed line of the recirculation line that receives the cooling fluid from the cooling fluid system and delivers the cooling fluid into the recirculation conduit of the recirculation block. Similarly, the return conduits of the interface block, the one or more expander blocks, and the one or more spacer blocks align to form a return line of the recirculation line that receives the cooling fluid from the recirculation conduit of the recirculation block and returns the cooling fluid to the cooling fluid system.

In addition to the plurality of coupling tubes that interconnect the recirculation block with at least the interface block as well as the one or more expander blocks, and the one or more spacer blocks, a bracket secures with the recirculation block and the interface block as well as the one or more expander blocks, and the one or more spacer blocks in order to assist in holding together the recirculation block, the interface block, the one or more expander blocks, and the one or more spacer blocks. The bracket includes at least a first slot configured to receive therein the inlet fitting inserted into the aperture of the recirculation block and a second slot adapted to receive therein the inlet fitting inserted into the aperture of the interface block. In a preferred embodiment, the bracket includes multiple slots configured to receive therein the inlet fittings inserted into the apertures of the recirculation block, the interface block, and the one or more expander blocks.

As described herein, a method for a cooling system of a dispensing station includes producing the modular manifold with the recirculation line therein from the recirculation block, the interface block, the one or more expander blocks, and the one or more spacer blocks. A drink outlet number corresponding to a total number of drink outlets of the dispensing station is determined. A total number of the expander blocks for the modular manifold corresponding to the drink outlet number minus two is determined. The expander blocks, the recirculation block, and the interface block are interconnected such that the expander blocks reside between the recirculation block and the interface block and align therewith in order to produce the modular manifold including therein the recirculation line. The modular manifold incorporates into the dispensing station, while each of the expander blocks, the recirculation block, and the interface block couples with one of the drink outlets of the dispensing station. In addition, each of the expander blocks, the recirculation block, and the interface block couples with a drink source. The recirculation line of the modular manifold at an inlet thereof couples with a cooling fluid feed line for a cooling system. Similarly, the recirculation line of the modular manifold at an outlet thereof couples with a cooling fluid return line for the cooling system. Upon a flowing of a drink through the modular manifold from a drink source, the modular manifold transfers heat from the drink to the cooling fluid circulating through the recirculation line of the modular manifold resulting in a chilling of the drink prior to a dispensing thereof from a drink outlet of the dispensing station.

The method for a cooling system of a dispensing station further includes producing the modular manifold with the recirculation line therein utilizing the one or more spacer blocks. A total number of the spacer blocks for the modular manifold corresponding to a number of spacer blocks required to space apart and align the recirculation block, the interface block, and the expander blocks with the drink outlets of the dispensing station is determined. The spacer blocks, the expander blocks, the recirculation block, and the interface block are interconnected such that the spacer blocks reside among the expander blocks, the recirculation block, and the interface block. More particularly, the spacer blocks align with the expander blocks, the recirculation block, and the interface block to produce the modular manifold including therein the recirculation line whereby the spacer blocks space apart and align the recirculation block, the interface block, and the expander blocks with the drink outlets of the dispensing station.

It is therefore an object of the present invention to provide a cooling system for a dispensing station that includes a modular manifold configured for incorporation into the dispensing station.

It is another object of the present invention to provide the modular manifold with a configuration including at least a recirculation block and an interface block, one or more expander blocks, and one or more spacer blocks that interconnect using a plurality of coupling tubes to produce the modular manifold.

It is a further object of the present invention to provide the modular manifold with a configuration that facilitates coupling thereof with multiple drink sources and multiple drink outlets of the dispensing station such that multiple drinks flowing through the modular manifold from the multiple drink sources transfer heat to the cooling fluid circulating through the recirculation line resulting in a chilling of the multiple drinks prior to a dispensing thereof from the multiple drink outlets.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

BRIEF DESCRIPTION OF DRAWINGS

FIG. 7 is a top plan elevation view illustrating the cooling system according to a preferred embodiment of the present invention.

FIG. 8 is a cross-sectional elevation view taken along lines A-A of FIG. 7 illustrating the cooling system according to a preferred embodiment of the present invention.

FIG. 15 is an isometric view illustrating an interface block of the cooling system according to a preferred embodiment of the present invention.

FIG. 16 is a front elevation view illustrating the interface block of the cooling system according to a preferred embodiment of the present invention.

FIG. 17 is a rear elevation view illustrating the interface block of the cooling system according to a preferred embodiment of the present invention.

FIG. 18 is a left side elevation view illustrating the interface block of the cooling system according to a preferred embodiment of the present invention.

FIG. 19 is a cross-sectional elevation view taken along lines D-D of FIG. 18 illustrating the interface block of the cooling system according to a preferred embodiment of the present invention.

FIG. 20 is an isometric view illustrating an expander block of the cooling system according to a preferred embodiment of the present invention.

FIG. 21 is a front elevation view illustrating the expander block of the cooling system according to a preferred embodiment of the present invention.

FIG. 22 is a rear elevation view illustrating the expander block of the cooling system according to a preferred embodiment of the present invention.

FIG. 23 is a left side elevation view illustrating the expander block of the cooling system according to a preferred embodiment of the present invention.

FIG. 24 is a cross-sectional elevation view taken along lines E-E of FIG. 23 illustrating the expander block of the cooling system according to a preferred embodiment of the present invention.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Figure 1:
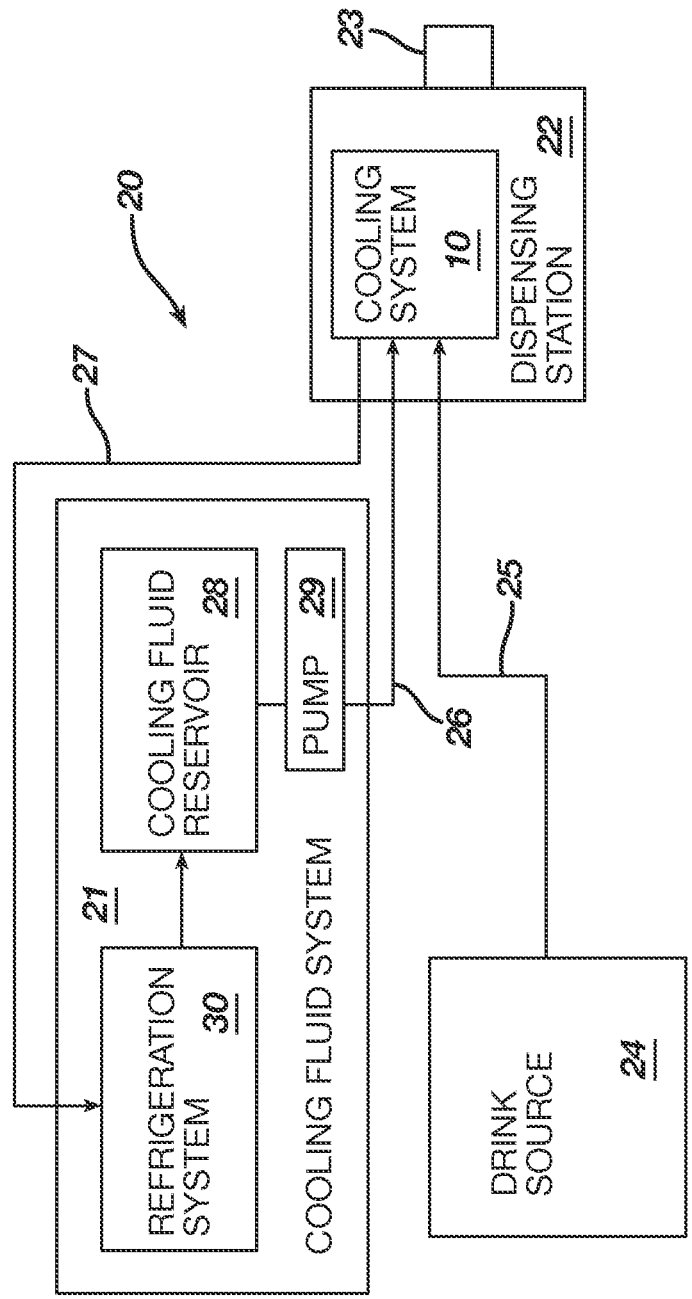
FIG. 1 is a schematic diagram illustrating a drink dispensing system implementing a cooling system according to a preferred embodiment of the present invention.

The present invention illustrated in the Figures and set forth in the following preferred embodiment is a cooling system 10 that incorporates into a drink dispensing system 20. Referring to FIG. 1, the drink dispensing system 20, which includes a cooling fluid system 21 and a dispensing station 22 with one or more drink outlets 23 disposed thereon, connects with a drink source 24 in order to dispense drinks delivered therefrom. In the preferred embodiment, the cooling system 10, more particularly, incorporates into the dispensing station 22 to facilitate a cooling of drinks delivered therefrom via the one or more drink outlets 23. Moreover, the cooling system 10, described herein, includes a modular configuration that permits multiple and varied numbers of drink outlets 23 from the dispensing station 22 without requiring an individual production process for the dispensing station 22.

The drink source 24 is any suitable drink source such as one or more beer kegs typically stored in a walk-in cooler. The drink source 24 connects with the dispensing station 22, and, more particularly, with the cooling system 10 via one or more drink lines 25, typically run through a trunk line. The cooling system 10 receives the drink or drinks, primarily beer, from the one or more drink lines 25 and then chills the one or more drinks prior to delivering the drink or drinks to the one or more drink outlets 23 for dispensing therefrom.

The cooling fluid system 21 in the preferred embodiment, which typically is located in the walk-in cooler, is any cooling fluid system suitable to circulate a chilled cooling fluid through the cooling system 10 via a connection therewith using a cooling fluid feed line 26 and a cooling fluid return line 27, typically run through the trunk line. For the sake of example and in order to aid in the understanding of the present invention, the cooling fluid system 21 will be described herein as a glycol chiller system including a cooling fluid reservoir 28, a pump 29, and a refrigeration system 30. The cooling fluid reservoir 28 contains therein a cooling fluid, which, in the present example, is a glycol/water mixture. The pump 29 connects at an inlet with an outlet from the cooling fluid reservoir 28 and at an outlet with the cooling fluid feed line 26 in order to deliver chilled cooling fluid to the cooling system 10. The chilled cooling fluid circulates through the cooling system 10 whereby the chilled cooling fluid absorbs heat from the drink or drinks resulting in a chilling thereof prior to the dispensing of the drink or drinks from the one or more drink outlets 23. After removing heat from the drink or drinks, the cooling fluid via the action of the pump 29 exits the cooling fluid system 10 and returns to the cooling fluid system 21 through the cooling fluid return line 27. More particularly, the cooling fluid return line 27 connects with an inlet of the refrigeration system 30 and conveys the cooling fluid thereto such that the refrigeration system 30 cools the cooling fluid. The refrigeration system 30 connects at an outlet with an inlet of the cooling fluid reservoir 28 in order to deliver chilled cooling fluid to the cooling fluid reservoir 28 for a repeat of the cooling cycle.

As illustrated in FIGS. 2-31, the cooling system 10 includes a recirculation block 50, an interface block 51, one or more expander blocks 52, and one or more spacer blocks 53 configurable into a modular manifold 54. The modular manifold 54 communicates with the cooling fluid system 21 via the cooling fluid feed line 26 and the cooling fluid return line 27 such that the cooling fluid system 21 circulates the cooling fluid, which is delivered chilled, through the modular manifold 54. The modular manifold 54 further communicates with the drink source 24 via the one or more drink lines 25 whereby the modular manifold 54 chills one or more drinks received from the drink source 24 prior to delivering the one or more drinks to the one or more drink outlets 23 for dispensing therefrom.

The cooling fluid system 10 includes a coupling tube 55, and, more particularly, two or more coupling tubes 55, that facilitate interconnection of the recirculation block 50, the interface block 51, the one or more expander blocks 52, and the one or more spacer blocks 53 during formation of the modular manifold 54. The cooling fluid system 10 includes one or more inlet fittings 56 securable with the recirculation block 50, the interface block 51, and the one or more expander blocks 52 whereby the one or more inlet fittings 56 connect with the one or more drink lines 25 to deliver one or more drinks to the modular manifold 54. The cooling fluid system 10 includes one or more outlet fittings 58 securable with the recirculation block 50, the interface block 51, and the one or more expander blocks 52 whereby the one or more outlet fittings 58 connect with the one or more drink outlets 23 to deliver one or more drinks from the modular manifold 54 to the one or more drink outlets 23.

The recirculation block 50 with reference to FIGS. 10-14 includes a three-dimensional shape and is manufactured from any suitable thermally conductive material such as aluminum in order to facilitate a transfer of heat from a drink passing through the recirculation block 50 to a cooling fluid circulated through the recirculation block 50. The recirculation block 50 includes front and rear surfaces 59 and 60, first and second sides 61 and 62, and first and second ends 63 and 64. The recirculation block 50 in the preferred embodiment includes screw holes 75 and 76 located at its rear surface 60 that permit use of a bracket system during formation of the modular manifold 54 employing the recirculation block 50.

The recirculation block 50 includes a recirculation conduit 65 therethrough that receives the cooling fluid therein and flows the cooling fluid through the recirculation block 50 while also reversing the flow of cooling fluid before the cooling fluid exits the recirculation block 50 in order to provide the modular manifold 54 with the capability of receiving a cooling fluid from the cooling fluid system 21 and then returning the cooling fluid to the cooling fluid system 21. The recirculation conduit 65 includes an inlet 66 located at its first end 63 configured to receive therein at least a segment of a coupling tube 55. The inlet 66 creates an entrance in the recirculation block 50 for a coupling thereof with one of an interface block 51, an expander block 52, and a spacer block 53 such that the recirculation block 50 receives cooling fluid into its recirculation conduit 65 from one of the interface block 51, the expander block 52, and the spacer block 53. The recirculation block 50 includes an outlet 67 located at its first end 63 configured to receive therein at least a segment of a coupling tube 55. The outlet 67 creates an exit in the recirculation block 50 for a coupling thereof with one of an interface block 51, an expander block 52, and a spacer block 53 such that the recirculation block 50 delivers cooling fluid from its recirculation conduit 65 to one of the interface block 51, the expander block 52, and the spacer block 53.

The recirculation conduit 65 includes a feed conduit 68, which defines the inlet 66 at the first end 63, connected with a return conduit 70, which defines the outlet 67 also at the first end 63, via a reversing conduit 69. The feed conduit 68 receives the cooling fluid therein at its inlet 66 from one of an interface block 51, an expander block 52, and a spacer block 53 and flows the cooling fluid into the recirculation block 50 for delivery to the reversing conduit 69. The reversing conduit 69 receives the cooling fluid therein whereby the reversing conduit 69 redirects the cooling fluid flow while continuing the flow thereof through the recirculation block 50 for delivery to the return conduit 70. The return conduit 70 receives the cooling fluid therein whereby the return conduit 70 redirects the cooling fluid flow such that the cooling fluid exits the recirculation block 50 from its outlet 67 into one of an interface block 51, an expander block 52, and a spacer block 53. The recirculation block 50 includes a plug 71 that seals an opening created in the recirculation block 50 during formation of the return conduit 69.

While the recirculation block 50 includes the inlet 66 and the outlet 67 configured to receive therein at least a segment of a coupling tube 55, one of ordinary skill in the art will recognize that, when the manifold 54 comprises the recirculation block 50 singularly, the inlet 66 and the outlet 67 may be configured for direct connection, respectively, with the cooling fluid feed line 26 and the cooling fluid return line 27. More particularly, the inlet 66 may include suitable connecting means such as threads that facilitate connection of the inlet 66 with a threaded fitting securable with the cooling fluid feed line 26 in order to deliver cooling fluid into the recirculation conduit 65 from the cooling fluid system 21. Similarly, the outlet 67 may include suitable connecting means such as threads that facilitate connection of the outlet 67 with a threaded fitting securable with the cooling fluid return line 27 in order to deliver cooling fluid from the recirculation conduit 65 for return to the cooling fluid system 21.

The recirculation block 50 includes an aperture 72 therethrough traversing the recirculation block 50 from its rear surface 60 to its front surface 59. The aperture 72 in the preferred embodiment resides interior of the recirculation channel 65 adjacent the feed conduit 68, the reversing conduit 69, and the return conduit 70 thereof. The aperture 72 includes an inlet segment 73 located at the rear surface 60 communicating with an outlet segment 74 located at the front surface 59. The inlet segment 73, which includes a first diameter, is configured to receive therein an inlet fitting 56 in order to permit delivery of a drink from the drink source 24 into the recirculation block 50. The outlet segment 74, which includes a second diameter greater than the first diameter, is configured to receive therein an outlet fitting 58 in order to permit delivery of a drink from the recirculation block 50 to a drink outlet 23 connected with the outlet fitting 58. The greater diameter of the outlet segment 74 relative to the inlet segment 73 prevents over-insertion of an outlet fitting 58 into the outlet segment 74 of the aperture 72. The outlet segment 74 of the aperture 72 in the preferred embodiment includes threads to facilitate securing of an outlet fitting 58 with the aperture 72 at its outlet segment 74. After a securing of an outlet fitting 58 with the aperture 72 at its outlet segment 74, an inlet fitting 56 inserts into the aperture 72 at its inlet segment 73 whereby the inlet fitting 56 inserts partially into the outlet fitting 58 in order to create fluid communication from the inlet fitting 56 into the outlet fitting 58.

Upon the insertion of the inlet and outlet fittings 56 and 58 into the recirculation block 50, the coupling of the inlet fitting 56 with the drink source 24, the connecting of the outlet fitting 58 with a drink outlet 23, and the coupling of the recirculation block 50 with the cooling fluid system 21, the recirculation block 50 is prepared to chill a drink prior to its dispensing from the drink outlet 23. The cooling fluid circulating through the recirculation conduit 65 cools the recirculation block 50 such that a drink passing through the inlet and outlet fittings 56 and 58 transfers heat to the cooling fluid via the recirculation block 50 resulting in a chilling of the drink prior to its dispensing from the drink outlet 23.

The interface block 51 with reference to FIGS. 15-19 includes a three-dimensional shape and is manufactured from any suitable thermally conductive material such as aluminum in order to facilitate a transfer of heat from a drink passing through the interface block 51 to a cooling fluid circulated through the interface block 51. The interface block 51 includes front and rear surfaces 79 and 80, first and second sides 81 and 82, and first and second ends 83 and 84. The interface block 51 in the preferred embodiment includes screw holes 95 and 96 located at its rear surface 80 that permit use of a bracket system during formation of the modular manifold 54 employing the interface block 51.

The interface block 51 provides the modular manifold 54 with the capability of coupling with the cooling fluid system 21 in order to receive cooling fluid therefrom and then return the cooling fluid thereto. The interface block 51 includes a feed conduit 85 therethrough that receives the cooling fluid therein and flows the cooling fluid through the interface block 51. The feed conduit 85 includes an inlet 86 located at the first end 83 of the interface block 51 that creates an entrance in the interface block 51 for a coupling thereof with the cooling fluid system 21. More particularly, the inlet 86 is configured for direct connection with the cooling fluid feed line 26 whereby the inlet 86 may include a suitable connecting means such as threads that facilitate connection of the inlet 86 with a threaded fitting securable with the cooling fluid feed line 26 in order to deliver cooling fluid into the feed conduit 85 from the cooling fluid system 21 via the cooling fluid feed line 26. The feed conduit 85 includes an outlet 87 located at the second end 84 of the interface block 51 configured to receive therein at least a segment of a coupling tube 55. The outlet 87 creates an exit in the interface block 51 for a coupling thereof with one of a recirculation block 50, an expander block 52, and a spacer block 53 such that the interface block 51 delivers cooling fluid from the feed conduit 85 to one of the recirculation block 50, the expander block 52, and the spacer block 53.

The interface block 51 includes a return conduit 88 therethrough that receives the cooling fluid therein and flows the cooling fluid through the interface block 51. The return conduit 88 includes an inlet 89 located at the second end 84 of the interface block 51 configured to receive therein at least a segment of a coupling tube 55. The inlet 89 creates an entrance in the interface block 51 for a coupling thereof with one of a recirculation block 50, an expander block 52, and a spacer block 53 such that the interface block 51 receives cooling fluid into its return conduit 88 from one of the recirculation block 50, the expander block 52, and the spacer block 53. The return conduit 88 includes an outlet 90 located at the first end 83 of the interface block 51 that creates an exit in the interface block 51 for a coupling thereof with the cooling fluid system 21. More particularly, the outlet 90 is configured for direct connection with the cooling fluid return line 27 whereby the outlet 90 may include a suitable connecting means such as threads that facilitate connection of the outlet 90 with a threaded fitting securable with the cooling fluid return line 27 in order to deliver cooling fluid from the return conduit 88 to the cooling fluid system 21 via the cooling fluid return line 27.

The interface block 51 includes an aperture 92 therethrough traversing the interface block 51 from its rear surface 80 to its front surface 79. The aperture 92 in the preferred embodiment resides interior of the feed conduit 85 and the return conduit 88 adjacent thereto. The aperture 92 includes an inlet segment 93 located at the rear surface 80 communicating with an outlet segment 94 located at the front surface 79. The inlet segment 93, which includes a first diameter, is configured to receive therein an inlet fitting 56 in order to permit delivery of a drink from the drink source 24 into the interface block 51. The outlet segment 94, which includes a second diameter greater than the first diameter, is configured to receive therein an outlet fitting 58 in order to permit delivery of a drink from the interface block 51 to a drink outlet 23 connected with the outlet fitting 58. The greater diameter of the outlet segment 94 relative to the inlet segment 93 prevents over-insertion of an outlet fitting 58 into the outlet segment 94 of the aperture 92. The outlet segment 94 of the aperture 92 in the preferred embodiment includes threads to facilitate securing of an outlet fitting 58 with the aperture 92 at its outlet segment 94. After a securing of an outlet fitting 58 with the aperture 92 at its outlet segment 94, an inlet fitting 56 inserts into the aperture 92 at its inlet segment 93 whereby the inlet fitting 56 inserts partially into the outlet fitting 58 in order to create fluid communication from the inlet fitting 56 into the outlet fitting 58.

Upon the insertion of the inlet and outlet fittings 56 and 58 into the interface block 51, the coupling of the inlet fitting 56 with the drink source 24, the connecting of the outlet fitting 58 with a drink outlet 23, and the coupling of the interface block 51 with the cooling fluid system 21, the interface block 51 is prepared to chill a drink prior to its dispensing from the drink outlet 23. The cooling fluid traversing the interface block 51 through the feed conduit 85 and the return conduit 88 cools the interface block 51 such that a drink passing through the inlet and outlet fittings 56 and 58 transfers heat to the cooling fluid via the interface block 51 resulting in a chilling of the drink prior to its dispensing from the drink outlet 23.

The expander block 52 with reference to FIGS. 20-24 includes a three-dimensional shape and is manufactured from any suitable thermally conductive material such as aluminum in order to facilitate a transfer of heat from a drink passing through the expander block 52 to a cooling fluid circulated through the expander block 52. The expander block 52 includes front and rear surfaces 99 and 100, first and second sides 101 and 102, and first and second ends 103 and 104. The expander block 52 in the preferred embodiment includes screw holes 115 and 116 located at its rear surface 100 that permit use of a bracket system during formation of the modular manifold 54 employing the expander block 52.

The expander block 52 provides the modular manifold 54 with its modular capability in that expander blocks 52 are added to or removed from the modular manifold 54 such that the modular manifold 54 is configured to deliver drinks to the drink outlets 23 of the dispensing station 22 corresponding in number with the number of drinks available from the drink source 24. The expander block 52 includes a feed conduit 105 therethrough that receives the cooling fluid therein and flows the cooling fluid through the expander block 52. The feed conduit 105 includes an inlet 106 located at the first end 103 of the expander block 52 configured to receive therein at least a segment of a coupling tube 55. The inlet 106 creates an entrance in the expander block 52 for a coupling thereof with one of an interface block 51, an additional expander block 52, and a spacer block 53 such that the expander block 52 receives cooling fluid into its feed conduit 105 from one of the interface block 51, the additional expander block 52, and the spacer block 53. The feed conduit 105 includes an outlet 107 located at the second end 104 of the expander block 52 configured to receive therein at least a segment of a coupling tube 55. The outlet 107 creates an exit in the expander block 52 for a coupling thereof with one of a recirculation block 50, an additional expander block 52, and a spacer block 53 such that the expander block 52 delivers cooling fluid from the feed conduit 105 to one of the recirculation block 50, the additional expander block 52, and the spacer block 53.

The expander block 52 includes a return conduit 108 therethrough that receives the cooling fluid therein and flows the cooling fluid through the expander block 52. The return conduit 108 includes an inlet 109 located at the second end 104 of the expander block 52 configured to receive therein at least a segment of a coupling tube 55. The inlet 109 creates an entrance in the expander block 52 for a coupling thereof with one of a recirculation block 50, an additional expander block 52, and a spacer block 53 such that the expander block 52 receives cooling fluid into its return conduit 108 from one of the recirculation block 50, the additional expander block 52, and the spacer block 53. The return conduit 108 includes an outlet 110 located at the first end 103 of the expander block 52 configured to receive therein at least a segment of a coupling tube 55. The outlet 110 creates an exit in the expander block 52 for a coupling thereof with one of an interface block 51, an additional expander block 52, and a spacer block 53 such that the expander block 52 delivers cooling fluid from its return conduit 108 to one of the interface block 51, the additional expander block 52, and the spacer block 53.

The expander block 52 includes an aperture 112 therethrough traversing the expander block 52 from its rear surface 100 to its front surface 99. The aperture 112 in the preferred embodiment resides interior of the feed conduit 105 and the return conduit 108 adjacent thereto. The aperture 112 includes an inlet segment 113 located at the rear surface 100 communicating with an outlet segment 114 located at the front surface 99. The inlet segment 113, which includes a first diameter, is configured to receive therein an inlet fitting 56 in order to permit delivery of a drink from the drink source 24 into the expander block 52. The outlet segment 114, which includes a second diameter greater than the first diameter, is configured to receive therein an outlet fitting 58 in order to permit delivery of a drink from the expander block 52 to a drink outlet 23 connected with the outlet fitting 58. The greater diameter of the outlet segment 114 relative to the inlet segment 113 prevents over-insertion of an outlet fitting 58 into the outlet segment 114 of the aperture 112. The outlet segment 114 of the aperture 112 in the preferred embodiment includes threads to facilitate securing of an outlet fitting 58 with the aperture 112 at its outlet segment 114. After a securing of an outlet fitting 58 with the aperture 112 at its outlet segment 114, an inlet fitting 56 inserts into the aperture 112 at its inlet segment 113 whereby the inlet fitting 56 inserts partially into the outlet fitting 58 in order to create fluid communication from the inlet fitting 56 into the outlet fitting 58.

Upon the insertion of the inlet and outlet fittings 56 and 58 into the expander block 52, the coupling of the inlet fitting 56 with the drink source 24, the connecting of the outlet fitting 58 with a drink outlet 23, and the coupling of the expander block 52 with the cooling fluid system 21, the expander block 52 is prepared to chill a drink prior to its dispensing from the drink outlet 23. The cooling fluid traversing the expander block 52 through the feed conduit 105 and the return conduit 108 cools the expander block 52 such that a drink passing through the inlet and outlet fittings 56 and 58 transfers heat to the cooling fluid via the expander block 52 resulting in a chilling of the drink prior to its dispensing from the drink outlet 23.

The spacer block 53 with reference to FIGS. 25-29 includes a three-dimensional shape and is manufactured from any suitable thermally conductive material such as aluminum in order to facilitate a circulation of cooling fluid through the spacer block 53. The spacer block 53 includes front and rear surfaces 109 and 120, first and second sides 121 and 122, and first and second ends 123 and 124.

The spacer block 53 provides the modular manifold 54 with its modular capability in that spacer blocks 52 are added to or removed from the modular manifold 54 such that the modular manifold 54 aligns with the drink outlets 23 of the dispensing station 22 whereby the modular manifold 54 is configured to deliver drinks to the drink outlets 23 corresponding in number with the number of drinks available from the drink source 24. The spacer block 53 includes a feed conduit 125 therethrough that receives the cooling fluid therein and flows the cooling fluid through the spacer block 53. The feed conduit 125 includes an inlet 126 located at the first end 123 of the spacer block 53 configured to receive therein at least a segment of a coupling tube 55. The inlet 126 creates an entrance in the spacer block 53 for a coupling thereof with one of an interface block 51, an expander block 52, and an additional spacer block 53 such that the spacer block 53 receives cooling fluid into its feed conduit 125 from one of the interface block 51, the expander block 52, and the additional spacer block 53. The feed conduit 125 includes an outlet 127 located at the second end 124 of the spacer block 53 configured to receive therein at least a segment of a coupling tube 55. The outlet 127 creates an exit in the spacer block 53 for a coupling thereof with one of a recirculation block 50, an expander block 52, and an additional spacer block 53 such that the spacer block 53 delivers cooling fluid from the feed conduit 125 to one of the recirculation block 50, the expander block 52, and the additional spacer block 53.

The spacer block 53 includes a return conduit 128 therethrough that receives the cooling fluid therein and flows the cooling fluid through the spacer block 53. The return conduit 128 includes an inlet 129 located at the second end 124 of the spacer block 53 configured to receive therein at least a segment of a coupling tube 55. The inlet 129 creates an entrance in the spacer block 53 for a coupling thereof with one of a recirculation block 50, an expander block 52, and an additional spacer block 53 such that the spacer block 53 receives cooling fluid into its return conduit 128 from one of the recirculation block 50, the expander block 52, and the additional spacer block 53. The return conduit 128 includes an outlet 130 located at the first end 123 of the spacer block 53 configured to receive therein at least a segment of a coupling tube 55. The outlet 130 creates an exit in the spacer block 53 for a coupling thereof with one of an interface block 51, an expander block 52, and an additional spacer block 53 such that the spacer block 53 delivers cooling fluid from its return conduit 128 to one of the interface block 51, the expander block 52, and the additional spacer block 53.

Figure 2:
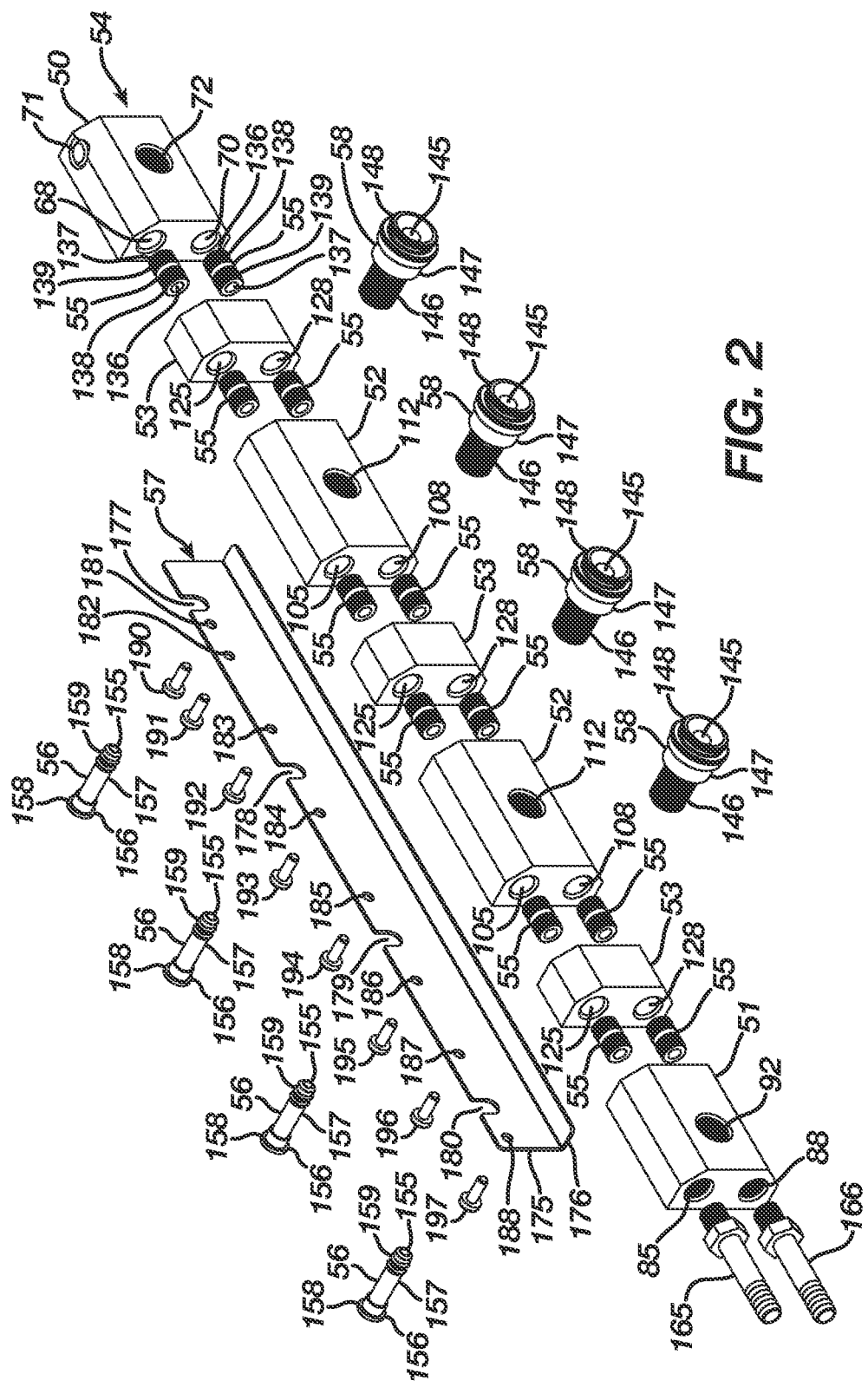
FIG. 2 is an exploded isometric view illustrating the cooling system according to a preferred embodiment of the present invention.
Figure 3:
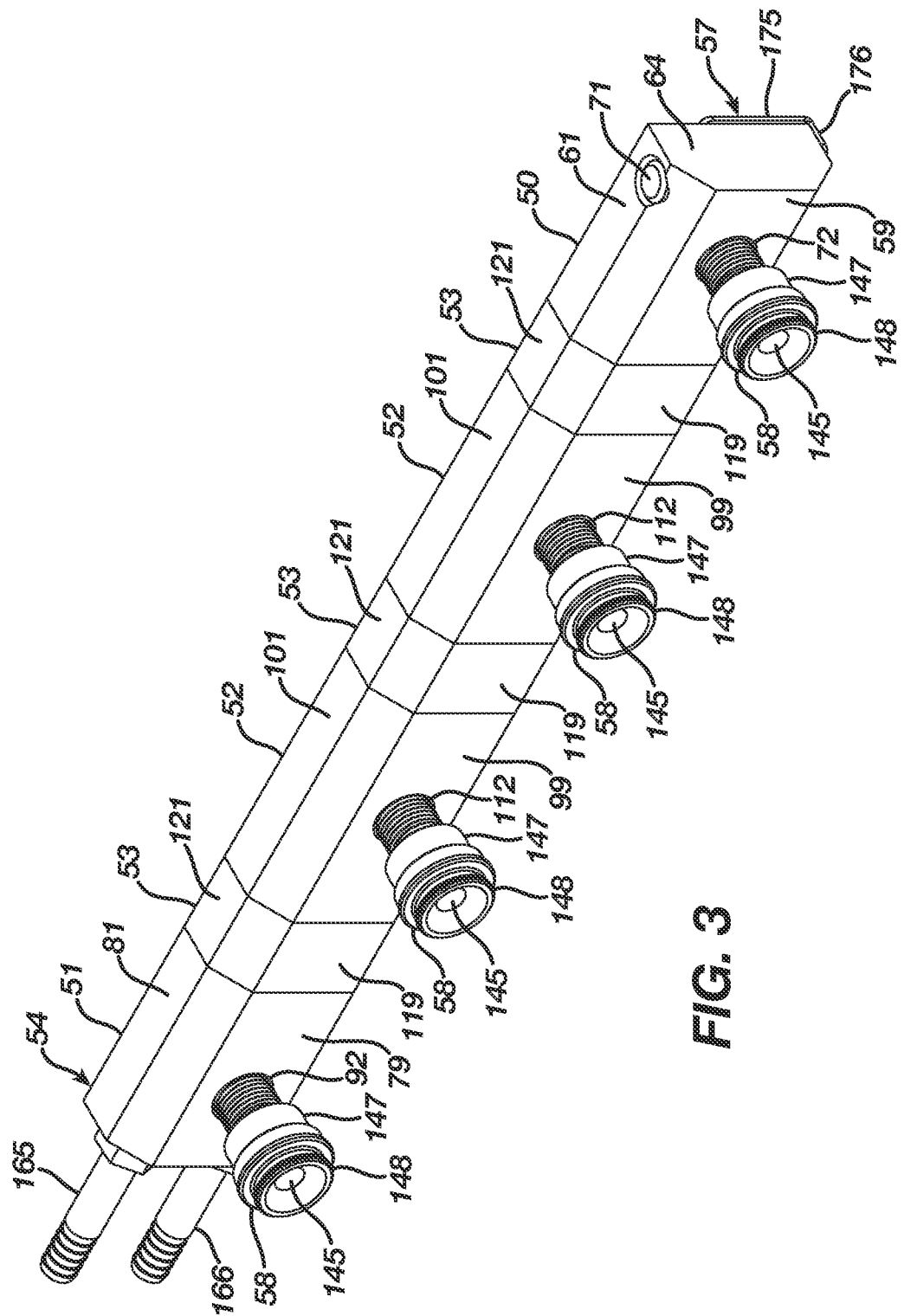
FIG. 3 is an isometric view illustrating the cooling system according to a preferred embodiment of the present invention.
Figure 4:
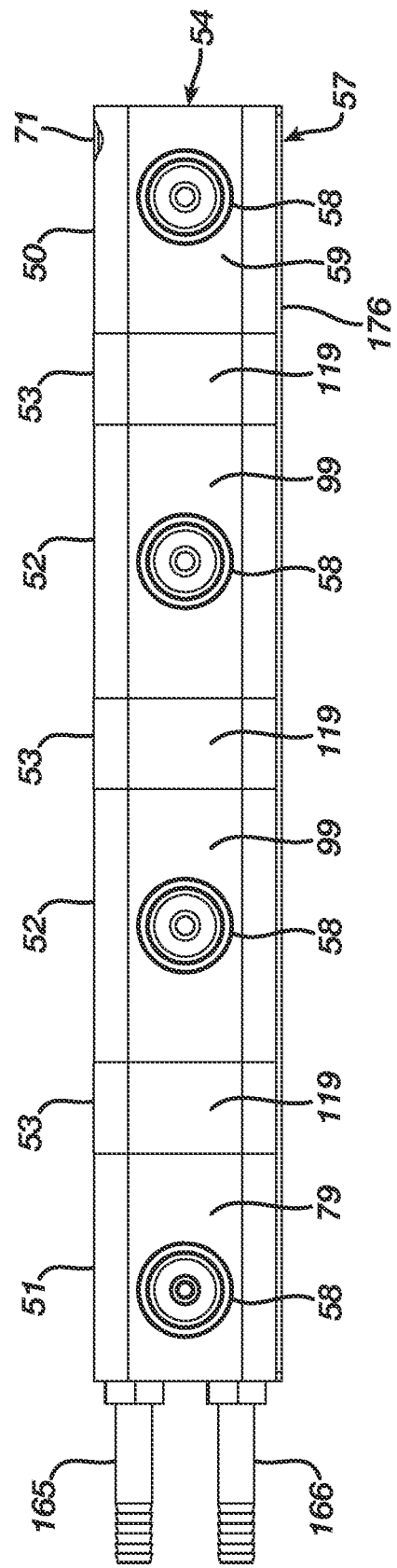
FIG. 4 is a front elevation view illustrating the cooling system according to a preferred embodiment of the present invention.
Figure 5:
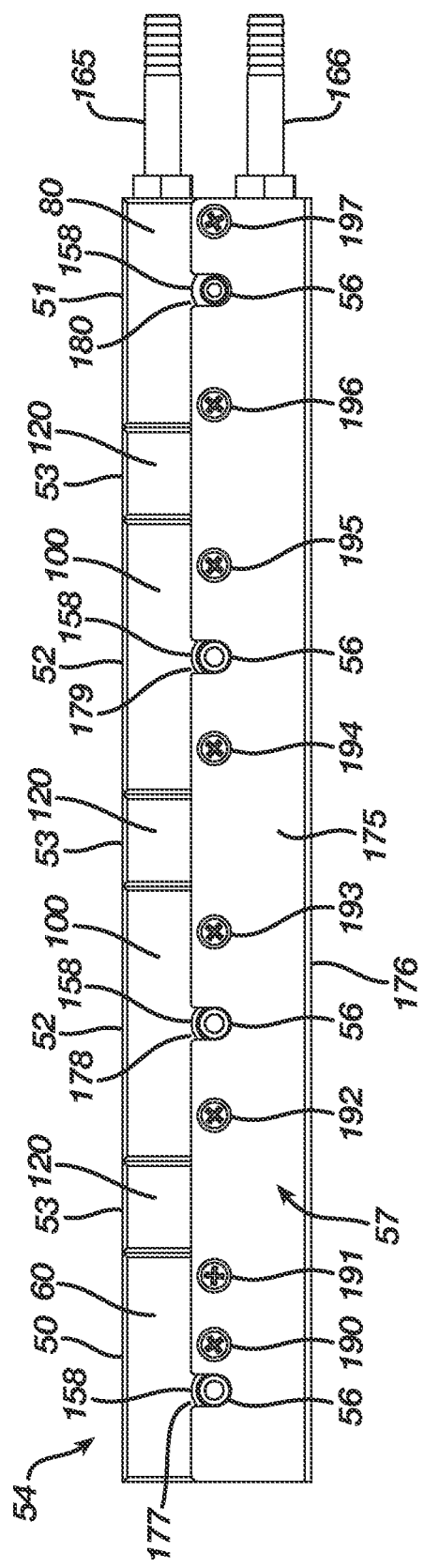
FIG. 5 is a rear elevation view illustrating the cooling system according to a preferred embodiment of the present invention.
Figure 6:
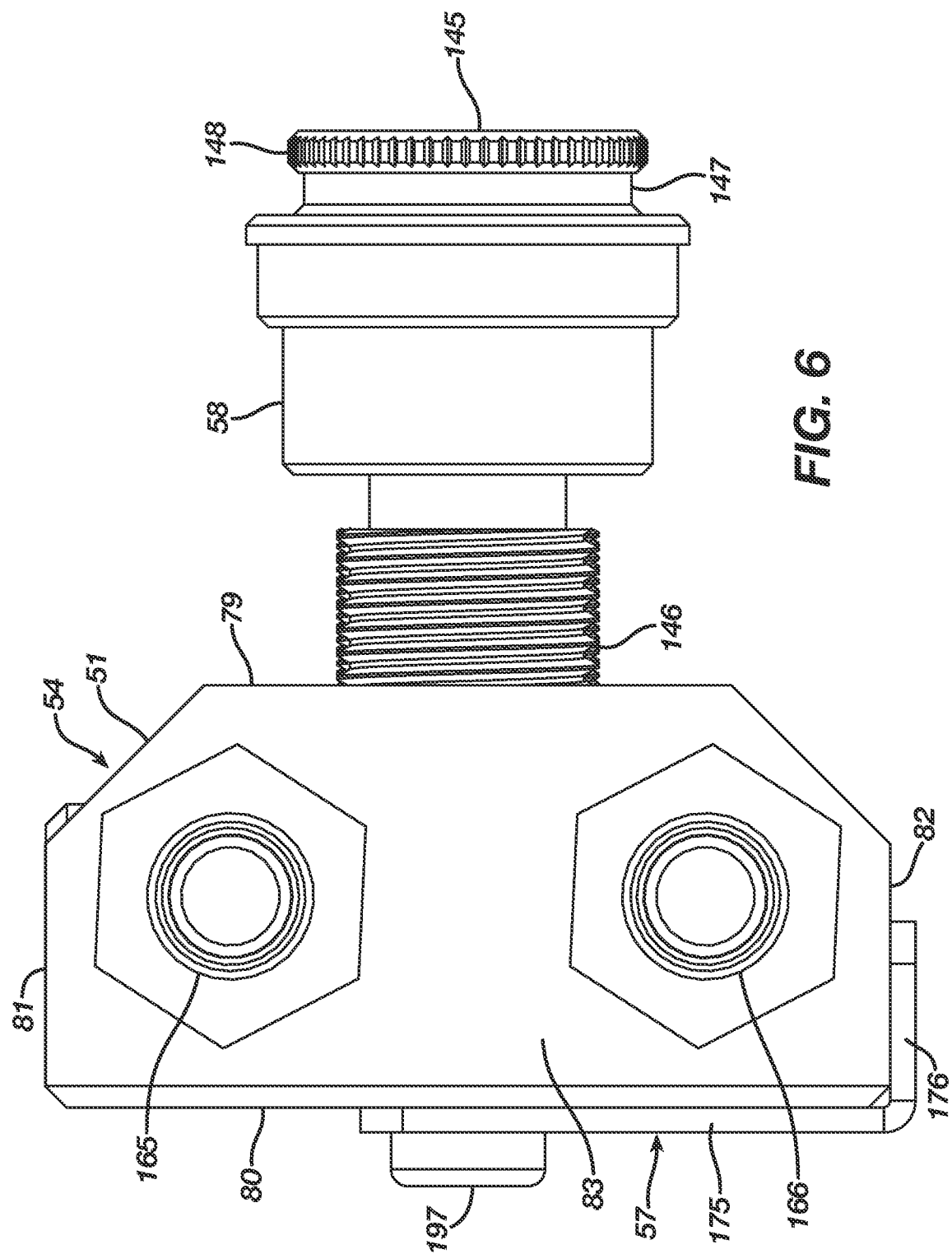
FIG. 6 is a left side elevation view illustrating the cooling system according to a preferred embodiment of the present invention.
Figure 9:
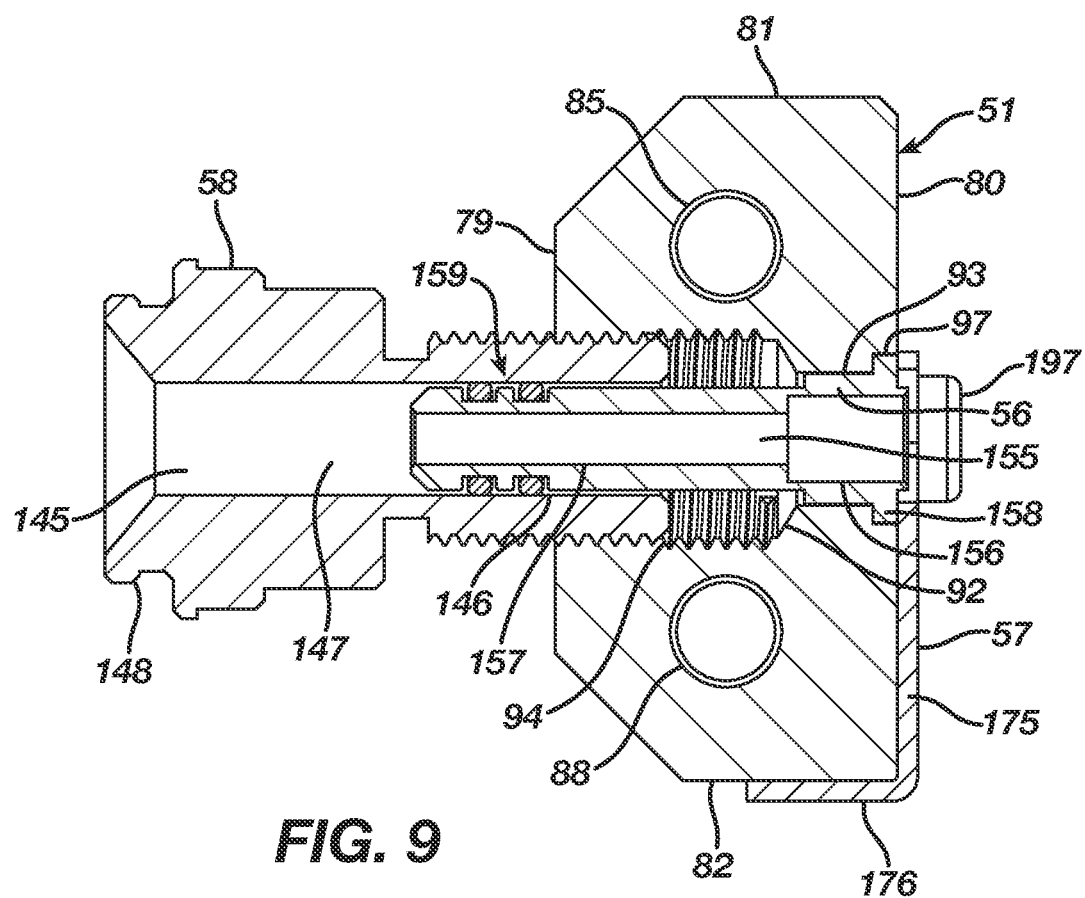
FIG. 9 is a cross-sectional elevation view taken along lines B-B of FIG. 8 illustrating the cooling system according to a preferred embodiment of the present invention.
Figure 10:
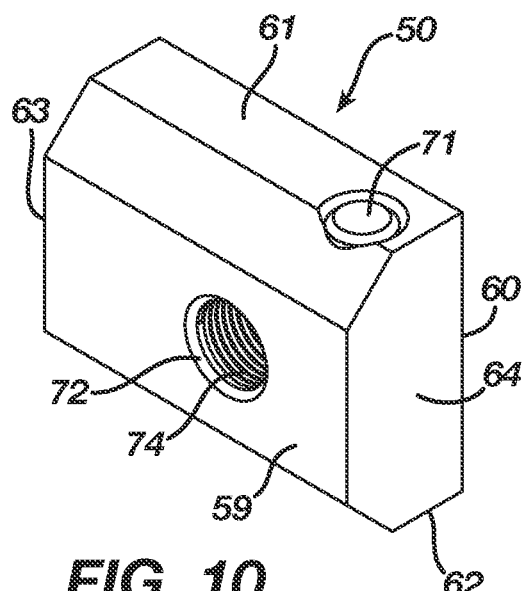
FIG. 10 is an isometric view illustrating a recirculation block of the cooling system according to a preferred embodiment of the present invention.
Figure 11:
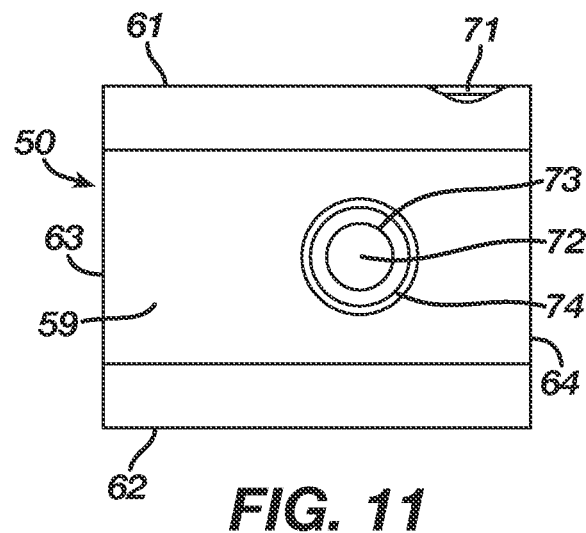
FIG. 11 is a front elevation view illustrating the recirculation block of the cooling system according to a preferred embodiment of the present invention.
Figure 12:
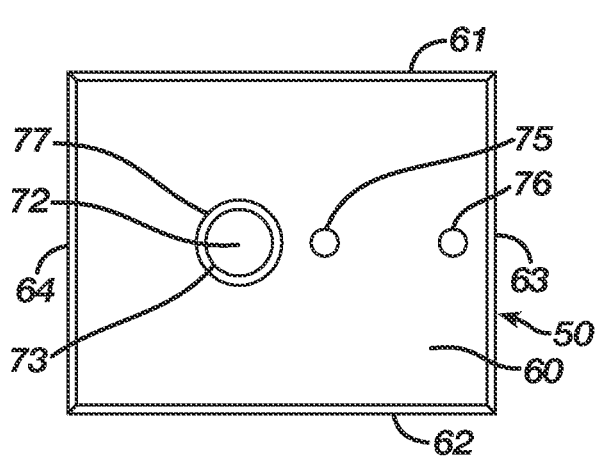
FIG. 12 is a rear elevation view illustrating the recirculation block of the cooling system according to a preferred embodiment of the present invention.
Figure 13:
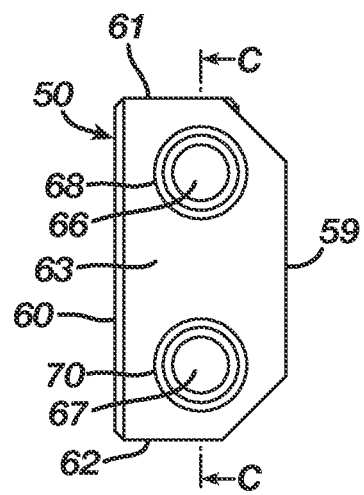
FIG. 13 is a left side elevation view illustrating the recirculation block of the cooling system according to a preferred embodiment of the present invention.
Figure 14:
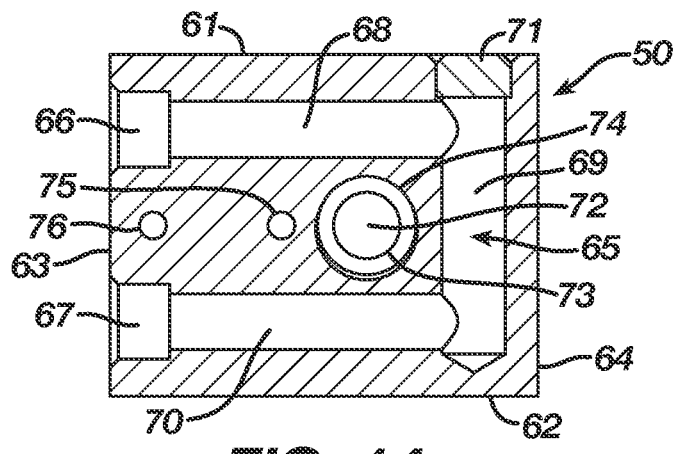
FIG. 14 is a cross-sectional elevation view taken along lines C-C of FIG. 13 illustrating the recirculation block of the cooling system according to a preferred embodiment of the present invention.
Figure 25:
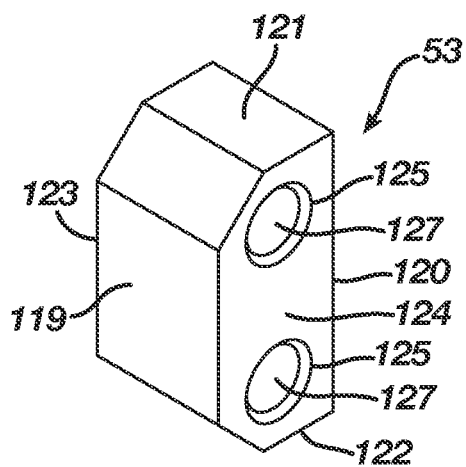
FIG. 25 is an isometric view illustrating a spacer block of the cooling system according to a preferred embodiment of the present invention.
Figure 26:
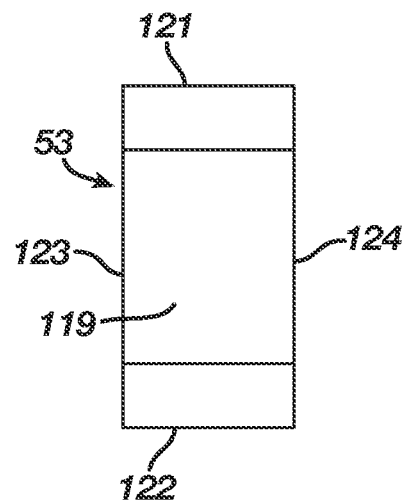
FIG. 26 is a front elevation view illustrating the spacer block of the cooling system according to a preferred embodiment of the present invention.
Figure 27:
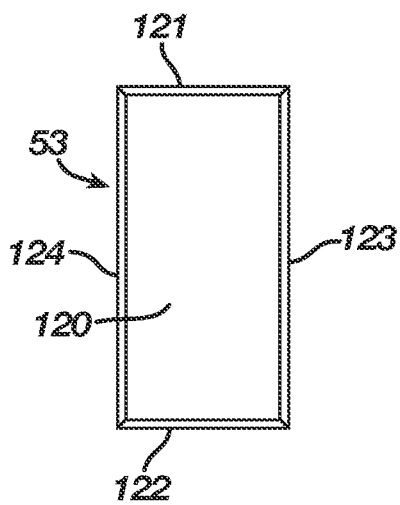
FIG. 27 is a rear elevation view illustrating the spacer block of the cooling system according to a preferred embodiment of the present invention.
Figure 28:
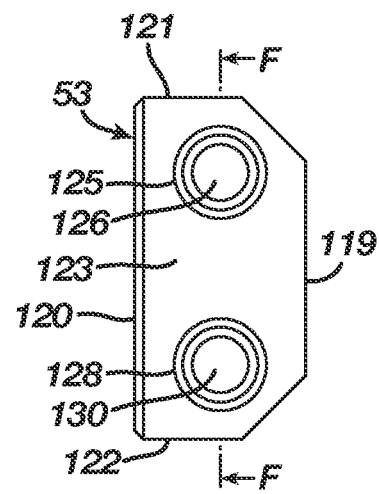
FIG. 28 is a left side elevation view illustrating the spacer block of the cooling system according to a preferred embodiment of the present invention.
Figure 29:
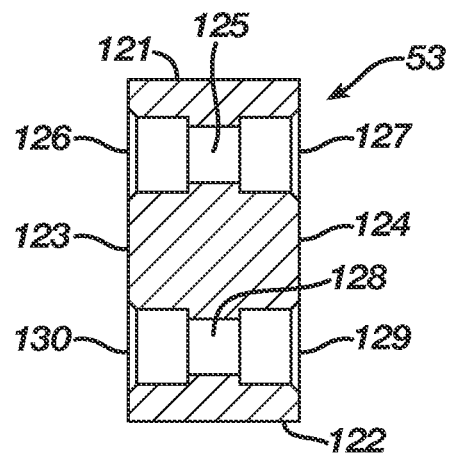
FIG. 29 is a cross-sectional elevation view taken along lines F-F of FIG. 28 illustrating the spacer block of the cooling system according to a preferred embodiment of the present invention.
Figure 30:
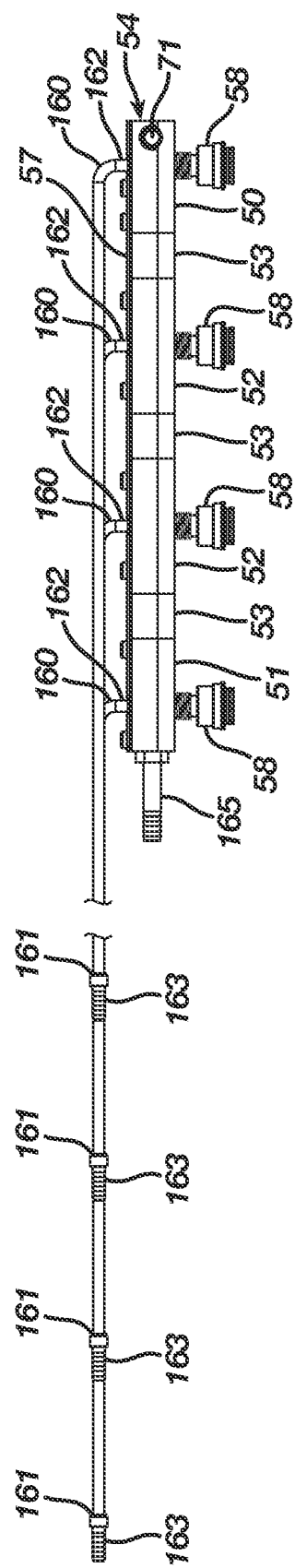
FIG. 30 is a top plan elevation view illustrating the cooling system according to a preferred embodiment of the present invention.
Figure 31:
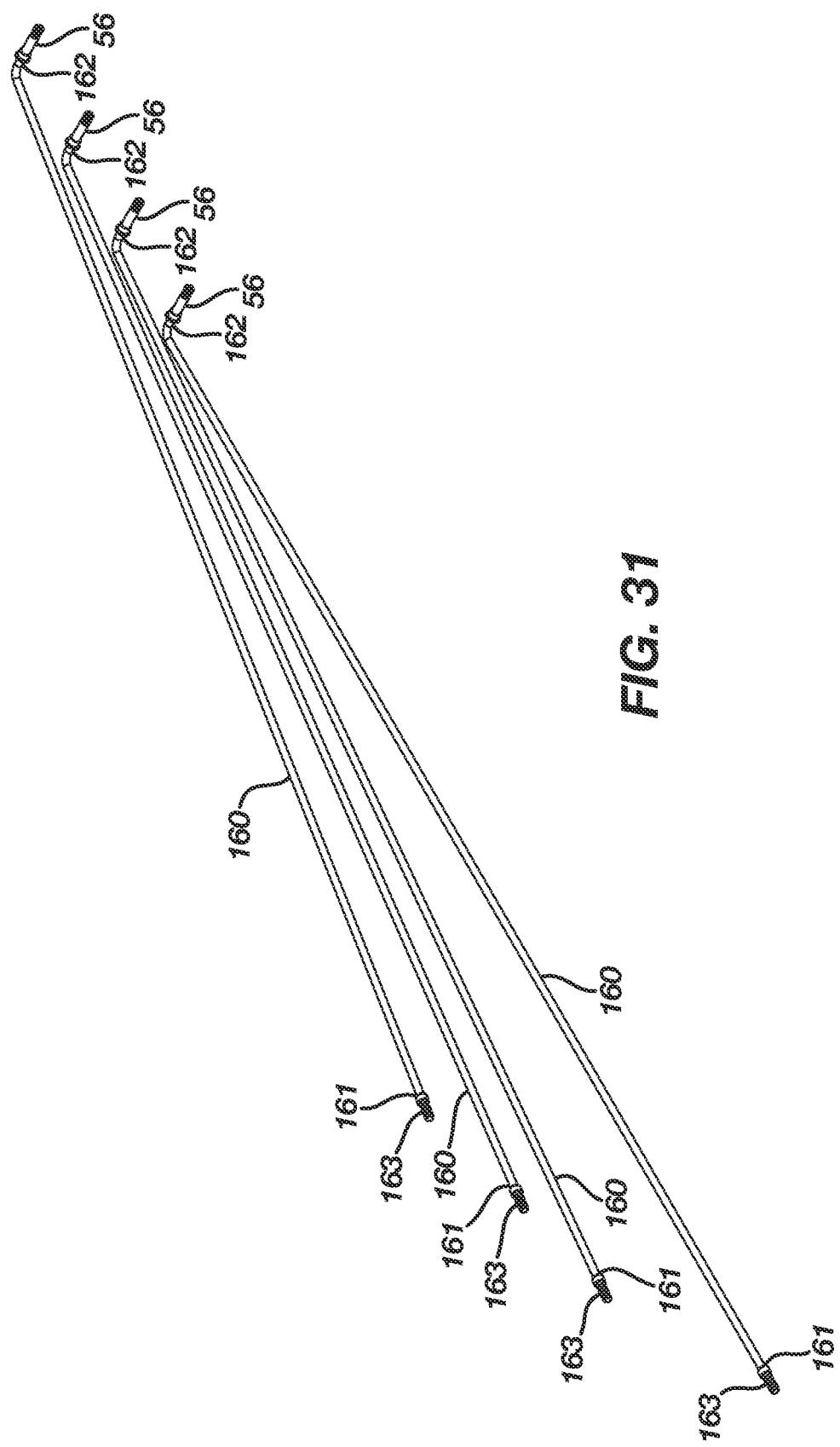
FIG. 31 is an isometric view illustrating inlet fittings of the cooling system according to a preferred embodiment of the present invention.

The coupling tubes 55 with reference to FIGS. 2 and 8 facilitate interconnection of a recirculation block 50, an interface block 51, one or more expander blocks 52, and one or more spacer blocks 53 in order to configure a modular manifold 54 that delivers drinks to the drink outlets 23 of the dispensing station 22 corresponding in number with the number of drinks available from the drink source 24. The coupling tubes 55 in the preferred embodiment are hollow cylinders manufactured from a suitable material such as aluminum or plastic. Each coupling tube 55 includes an inlet side 136 and an outlet side 137 and a passage 135 therethrough such that cooling fluid flows through the passage 135 from the inlet side 136 to the outlet side 137. Each coupling tube 55 includes a seal 138 on its exterior at the inlet side 136 and a seal 139 on its exterior at the outlet side 137 whereby the seals 138 and 139 assist in securing the modular manifold 54 together while further fluidly sealing the modular manifold 54 to permit cooling fluid flow therethrough. The seal 138 in the preferred embodiment includes first and second o-rings disposed in respective first and second grooves located in the exterior of the coupling tube 55 at its inlet side 136. Similarly, the seal 139 in the preferred embodiment includes first and second o-rings disposed in respective first and second grooves located in the exterior of the coupling tube 55 at its outlet side 137.

Operation of the coupling tubes 55 in formation of a modular manifold 54 will be described herein with reference to an interconnection of a recirculation block 50 with a spacer block 53. Nevertheless, one of ordinary skill in the art will recognize that any interconnection among a recirculation block 50, an interface block 51, one or more expander blocks 52, and one or more spacer blocks 53 using the coupling tubes 55 will be identical to the described interconnection of the recirculation block 50 with the spacer block 53. The recirculation block 50 at its first end 63 is positioned adjacent the spacer block 53 at its second end 124 such that the recirculation conduit 65 of the recirculation block 50 at its inlet 66 aligns with the feed conduit 125 of the spacer block 53 at its outlet 127 and the recirculation conduit 65 of the recirculation block 50 at its outlet 67 aligns with the return conduit 128 of the spacer block 53 at its inlet 129. A first coupling tube 55 at its outlet side 137 inserts into the inlet 66 of the recirculation conduit 65 such that the seal 139 resides in the inlet 66, while a second coupling tube 55 at its inlet side 136 inserts into the outlet 67 of the recirculation conduit 65 such that the seal 138 resides in the outlet 67. As the recirculation block 50 at its first end 63 is moved into abutting relationship with the spacer block 53 at its second end 124, the first coupling tube 55 at its inlet side 136 inserts into the outlet 127 of the feed conduit 125 such that the seal 138 resides in the outlet 128, while the second coupling tube 55 at its outlet side 137 inserts into the inlet 129 of the return conduit 128 such that the seal 139 resides in the inlet 129. The first and second coupling tubes 55 secure the recirculation block 50 with the spacer block 53 in the formation of the manifold 54 and further fluidly connect, respectively, the feed conduit 125 and the return conduit 128 of the spacer block 53 with the recirculation conduit 65 of the recirculation block 50 whereby the feed conduit 125 via the first coupling tube 55 delivers cooling fluid into the recirculation conduit 65 and the recirculation conduit 65 via the second coupling tube 55 delivers cooling fluid into the return conduit 128. While the coupling tubes 55 in the preferred embodiment are parts separate from the recirculation block 50, the interface block 51, the one or more expander blocks 52, and the one or more spacer blocks 53, one of ordinary skill in the art will recognize that the coupling tubes 55 may be integrated with certain inlets and outlets of the recirculation block 50, the interface block 51, the one or more expander blocks 52, and the one or more spacer blocks 53 while still allowing an interconnection among the recirculation block 50, the interface block 51, the one or more expander blocks 52, and the one or more spacer blocks 53.

The outlet fittings 58 with reference to FIGS. 2-4, 6-7, and 9 secure, respectively, with one of the recirculation block 50, the interface block 51, and the expander blocks 52 and then connect, respectively, with a drink outlet 23 of the dispensing station 22 to deliver a drink from one of the recirculation block 50, the interface block 51, and the expander blocks 52 to the drink outlet 23. The outlet fittings 58 in the preferred embodiment are hollow cylinders manufactured from a suitable material such as aluminum. Each outlet fitting 58 includes an inlet side 146 and an outlet side 147 and a passage 145 therethrough such that a drink flows through the passage 145 from the inlet side 146 to the outlet side 147. Each outlet fitting 58 in the preferred embodiment includes on its exterior at the inlet side 146 threads to facilitate securing thereof with one of the recirculation block 50, the interface block 51, and the expander blocks 52. More particularly, an outlet fitting 58 threads, respectively, into one of the outlet segments 74, 94, and 114 of the apertures 72, 92, 112 for the recirculation block 50, the interface block 51, and the expander blocks 52. Each outlet fitting 58 in the preferred embodiment includes on its exterior at the outlet side 147 an engagement feature 148 that facilitates securing thereof with a drink outlet 23 of the dispensing station 22. In the preferred embodiment, the engagement feature 148 inserts into a coupler of a drink outlet 23 whereby the coupler secures the engagement feature 148 therein in a manner well-known to one of ordinary skill in the drink dispensing art.

The inlet fittings 56 with reference to FIGS. 2, 5, and 30-31 secure, respectively, with one of the recirculation block 50, the interface block 51, and the expander blocks 52 and then connect, respectively, with the drink source 24 to deliver a drink from the drink source 24 to one of the recirculation block 50, the interface block 51, and the expander blocks 52 corresponding in number with the number of drinks available from the drink source 24. The inlet fittings 56 in the preferred embodiment are hollow cylinders manufactured from a suitable material such as aluminum. Each inlet fitting 56 includes an inlet side 156 and an outlet side 157 and a passage 155 therethrough such that a drink flows through the passage 155 from the inlet side 156 to the outlet side 157. Each inlet fitting 56 in the preferred embodiment includes on its exterior at the inlet side 156 a flange 158 that limits insertion of the inlet fitting 56 into one of the apertures 72, 92, and 112 for the recirculation block 50, the interface block 51, and the expander blocks 52. The inlet fitting 56 inserts into one of the apertures 72, 92, and 112 at a respective inlet segment 73, 93, and 113 thereof until the flange 158 abuts one of the rear surfaces 60, 80, and 100 for the recirculation block 50, the interface block 51, and the expander blocks 52. In the preferred embodiment, the flange 158 seats in one of a recess 77, 97, and 117 located, respectively, in the rear surfaces 60, 80, and 100 at the inlet segments 73, 93, and 113 for the apertures 72, 92, and 112 in order to position the inlet fitting 56 within one of the apertures 72, 92, and 112. Each inlet fitting 56 in the preferred embodiment includes on its exterior at the outlet side 157 a seal 159 that assists in securing the inlet fitting 56 with one of the recirculation block 50, the interface block 51, and the expander blocks 52. Upon inserting the inlet fitting 56 into one of the apertures 72, 92, and 112 at a respective inlet segment 73, 93, and 113 thereof, the outlet side 157 of the inlet fitting 56 resides in the inlet side 146 of the outlet fitting 58 whereby the seal 159 assists in securing the inlet fitting 56 at its outlet side 56 with the outlet fitting 58 at its inlet side 146 while further fluidly sealing the inlet fitting 56 with the outlet fitting 58 in order to create fluid communication from the inlet fitting 56 via its passage 155 into the outlet fitting 58 via its passage 145. The seal 159 in the preferred embodiment includes first and second o-rings disposed in respective first and second grooves located in the exterior of the inlet fitting 56 at its outlet side 157.

The cooling system 10 in the preferred embodiment includes one or more inlet conduits 160 that connect with the one or more inlet fittings 56 at an inlet side 156 thereof and with the one or more drink lines 25 in order to deliver a drink to the one or more fittings 56 corresponding in number with the number of drinks available from the drink source 24. In the preferred embodiment, each of the inlet conduits 160 comprises an aluminum conduit and includes a first end 161 and a second end 162. The first end 161 of the inlet conduit 160 secures with a barbed fitting 163 using suitable means such as welding whereby the barbed fitting 163 is connectable with a drink line 25. The second end 162 of the inlet conduit 160 secures with an inlet fitting 56 at its inlet side 156 using suitable means such as welding. In the alternative, the inlet conduit 160 may be a flexible conduit with the first end 161 and the second end 162. The first end 161 secures with a barbed fitting 163 using suitable means such as a clamp. When the inlet conduit 160 is flexible, the inlet fittings 56 at their inlet sides 156 each include a barbed fitting secured therewith using suitable means such as welding whereby the second end 162 connects with the barbed fitting using suitable means such as a clamp. While the cooling system 10 includes the inlet conduit 160, one of ordinary skill in the art will recognize that an inlet fitting 56 including a barbed fitting secured with its inlet side 156 may connect directly with a drink line 25.

Configurations of the modular manifold 54 include a recirculation block 50 singularly for a dispensing of a single drink from a dispensing station 22 with one drink outlet 23; a recirculation block 50 and an interface block 51 coupled for a dispensing of two drinks from a dispensing station 22 with two drink outlets 23; and a recirculation block 50, an interface block 51, one or more expander blocks 52, and, if necessary, one or more spacer blocks 53 coupled for a dispensing of three or more drinks from a dispensing station 22 with three or more drink outlets 23. In order to aid in the understanding of the present invention, an example implementation of the modular manifold 54 will be described herein with reference to FIGS. 2-9 and 30-31 whereby the modular manifold 54 is configured to receive four individual drinks from a drink source 24 including four individual drink sources and then deliver the four drinks to four drink outlets 23 of a dispensing station 22 for dispensing therefrom. The modular manifold 54 according to the example implantation includes a recirculation block 50, an interface block 51, two expander blocks 52, and three spacer blocks 53 interconnected using coupling tubes 55 as follows.

The recirculation block 50 at its first end 63 abuts a first spacer block 53 at its second end 124 such that the feed conduit 68 of the recirculation conduit 65 for the recirculation block 50 at the inlet 66 aligns with the feed conduit 125 of the first spacer block 53 at the outlet 127 and the return conduit 70 of the recirculation conduit 65 for the recirculation block 50 at the outlet 67 aligns with the return conduit 128 of the first spacer block 53 at the inlet 129 whereby a first coupling tube 55 disposed in the inlet 66 and the outlet 127 and a second coupling tube 55 disposed in the outlet 67 and the inlet 129 secure the recirculation block 50 with the first spacer block 53 and further fluidly connect the feed conduits 68 and 125 and the return conduits 70 and 128. The first spacer block 53 at its first end 123 abuts a first expander block 52 at its second end 104 such that the feed conduit 125 of the first spacer block 53 at the inlet 126 aligns with the feed conduit 105 of the first expander block 52 at the outlet 107 and the return conduit 128 of the first spacer block 53 at the outlet 130 aligns with the return conduit 108 of the first expander block 52 at the inlet 109 whereby a third coupling tube 55 disposed in the inlet 126 and the outlet 107 and a fourth coupling tube 55 disposed in the outlet 130 and the inlet 109 secure the first spacer block 53 with the first expander block 52 and further fluidly connect the feed conduits 105 and 125 and the return conduits 108 and 128. The first expander block 53 at its first end 103 abuts a second spacer block 53 at its second end 124 such that the feed conduit 105 of the first expander block 52 at the inlet 106 aligns with the feed conduit 125 of the second spacer block 53 at the outlet 127 and the return conduit 108 of the first expander block 52 at the outlet 110 aligns with the return conduit 128 of the second spacer block 53 at the inlet 129 whereby a fifth coupling tube 55 disposed in the inlet 106 and the outlet 127 and a sixth coupling tube 55 disposed in the outlet 110 and the inlet 129 secure the first expander block 52 with the second spacer block 53 and further fluidly connect the feed conduits 105 and 125 and the return conduits 108 and 128. The second spacer block 53 at its first end 123 abuts a second expander block 52 at its second end 104 such that the feed conduit 125 of the second spacer block 53 at the inlet 126 aligns with the feed conduit 105 of the second expander block 52 at the outlet 107 and the return conduit 128 of the second spacer block 53 at the outlet 130 aligns with the return conduit 108 of the second expander block 52 at the inlet 109 whereby a seventh coupling tube 55 disposed in the inlet 126 and the outlet 107 and an eighth coupling tube 55 disposed in the outlet 130 and the inlet 109 secure the second spacer block 53 with the second expander block 52 and further fluidly connect the feed conduits 105 and 125 and the return conduits 108 and 128. The second expander block 53 at its first end 103 abuts a third spacer block 53 at its second end 124 such that the feed conduit 105 of the second expander block 52 at the inlet 106 aligns with the feed conduit 125 of the third spacer block 53 at the outlet 127 and the return conduit 108 of the second expander block 52 at the outlet 110 aligns with the return conduit 128 of the third spacer block 53 at the inlet 129 whereby a ninth coupling tube 55 disposed in the inlet 106 and the outlet 127 and a tenth coupling tube 55 disposed in the outlet 110 and the inlet 129 secure the second expander block 52 with the third spacer block 53 and further fluidly connect the feed conduits 105 and 125 and the return conduits 108 and 128. The third spacer block 53 at its first end 123 abuts an interface block 51 at its second end 84 such that the feed conduit 125 of the third spacer block 53 at the inlet 126 aligns with the feed conduit 85 of the interface block 51 at the outlet 87 and the return conduit 128 of the third spacer block 53 at the outlet 130 aligns with the return conduit 88 of the interface block 51 at the inlet 89 whereby an eleventh coupling tube 55 disposed in the inlet 126 and the outlet 87 and a twelfth coupling tube 55 disposed in the outlet 130 and the inlet 89 secure the third spacer block 53 with the interface block 51 and further fluidly connect the feed conduits 85 and 125 and the return conduits 88 and 128. A fitting 165 threads into the inlet 86 of the interface block 51, while a fitting 166 threads into the outlet 90 of the interface block 51. In the formation of the example modular manifold 54 comprising a recirculation block 50, an interface block 51, two expander blocks 52, and three spacer blocks 53, the feed conduits 85, 105, and 125; the recirculation conduit 65, which includes the feed conduit 68, the reversing conduit 69, and the return conduit 70; and the return conduits 98, 108, and 128 create a recirculation line 170 including a feed line 171 and a return line 172 connected by the recirculation conduit 65.

In addition to interconnecting a recirculation block 50, an interface block 51, two expander blocks 52, and three spacer blocks 53 during formation of the example modular manifold 54, the example modular manifold 54 receives four outlet fittings 58 and four inlet fittings 56. A first outlet fitting 58 threads into the outlet segment 74 of the aperture 72 for the recirculation block 50, while a first inlet fitting 56 inserts into the inlet segment 73 of the aperture 72 for the recirculation block 50 such that the first inlet fitting 56 fluidly communicates with the first outlet fitting 58. A second outlet fitting 58 threads into the outlet segment 114 of the aperture 112 for the first expander block 52, while a second inlet fitting 56 inserts into the inlet segment 113 of the aperture 112 for the first expander block 52 such that the second inlet fitting 56 fluidly communicates with the second outlet fitting 58. A third outlet fitting 58 threads into the outlet segment 114 of the aperture 112 for the second expander block 52, while a third inlet fitting 56 inserts into the inlet segment 113 of the aperture 112 for the second expander block 52 such that the third inlet fitting 56 fluidly communicates with the third outlet fitting 58. A fourth outlet fitting 58 threads into the outlet segment 94 of the aperture 92 for the interface block 51, while a fourth inlet fitting 56 inserts into the inlet segment 93 of the aperture 92 for the interface block 51 such that the fourth inlet fitting 56 fluidly communicates with the fourth outlet fitting 58.

After incorporating the example modular manifold 54 into a dispensing station 22 including four drink outlets 23, the first outlet fitting 58 connects with a first drink outlet 23, the second outlet fitting 58 connects with a second drink outlet 23, the third outlet fitting 58 connects with a third drink outlet 23, and the fourth outlet fitting 58 connects with a fourth drink outlet 23. The first inlet fitting 56 via its inlet conduit 160 connects with a first drink line 25 attached to a first individual drink source of the drink source 24, the second inlet fitting 56 via its inlet conduit 160 connects with a second drink line 25 attached to a second individual drink source of the drink source 24, the third inlet fitting 56 via its inlet conduit 160 connects with a third drink line 25 attached to a third individual drink source of the drink source 24, the fourth inlet fitting 56 via its inlet conduit 160 connects with a fourth drink line 25 attached to a fourth individual drink source of the drink source 24. The example modular manifold 54 connects with the cooling fluid system 21 through a securing of the fitting 165 with the cooling fluid feed line 26 using suitable connecting means such as barbs and/or a clamp and a securing of the fitting 166 with the cooling fluid return line 27 using suitable connecting means such as barbs and/or a clamp.

In chilling the first, second, third, and fourth drinks prior to their dispensing, the cooling fluid system 21 via the cooling fluid feed line 26 delivers chilled cooling fluid to the recirculation line 170 of the example modular manifold 54. The recirculation line 170 flows the cooling fluid through the example modular manifold 54 prior to returning the cooling fluid to the cooling fluid system 21 via the cooling fluid return line 27. More specifically, the feed line 171 receives the chilled cooling fluid therein and flows the cooling fluid into the recirculation conduit 65 for redirection thereof into the return line 172 whereby the return line 172 returns the cooling fluid to the cooling fluid system 21 via the cooling fluid return line 27. The cooling fluid circulating through the example modular manifold 54 cools the example modular manifold 54 and, in particular, the interface block 51, the first and second expander blocks 52, the recirculation block 50 as well as the first, second, and third spacer blocks 53.

Upon the cooling of the example modular manifold 54, a first drink delivered from the first individual drink source passes through the first inlet and outlet fittings 56 and 58 engaged with the recirculation block 50 such that the first drink transfers heat to the cooling fluid via the recirculation block 50 resulting in a chilling of the first drink prior to its dispensing from the first drink outlet 23. The second drink delivered from the second individual drink source passes through the second inlet and outlet fittings 56 and 58 engaged with the first expander block 52 such that the second drink transfers heat to the cooling fluid via the first expander block 52 resulting in a chilling of the second drink prior to its dispensing from the second drink outlet 23. The third drink delivered from the third individual drink source passes through the third inlet and outlet fittings 56 and 58 engaged with the second expander block 52 such that the third drink transfers heat to the cooling fluid via the second expander block 52 resulting in a chilling of the third drink prior to its dispensing from the third drink outlet 23. The fourth drink delivered from the fourth individual drink source passes through the fourth inlet and outlet fittings 56 and 58 engaged with the interface block 51 such that the fourth drink transfers heat to the cooling fluid via the interface block 51 resulting in a chilling of the fourth drink prior to its dispensing from the fourth drink outlet 23.

While the coupling tubes 55 secure the manifold 54 together, the cooling system 10 may include a bracket system in order to more firmly secure together the manifold 54 and the inlet fittings 56 thereof. The bracket system in the preferred embodiment includes one or more brackets as illustrated by the bracket 57 which is representative of the bracket system. The bracket 57 as illustrated in FIGS. 2, 5, 6, and 7 is configured for use with the example modular manifold 54 comprised of the recirculation block 50, the interface block 51, the first and second expander blocks 52, and the first, second, and third spacer blocks 53. The bracket 57 includes a back plate 175 and a base 176 extending therefrom. The bracket 57 in the back plate 176 includes slots 177-180 that register, respectively, with the aperture 72 of the recirculation block 50 at its inlet segment 73, the apertures 112 of the first and second expander blocks 52 at their inlet segments 113, and the aperture 92 of the interface block 51 at its inlet segment 93. The bracket 57 in the back plate 176 includes holes 181-188 that register, respectively, with the screw holes 75 and 76 of the recirculation block 50, the screw holes 115 and 116 of the first and second expander blocks 52, and the screw holes 95 and 96 of the interface block 51. When securing the bracket 57 with the example modular manifold 54, the recirculation block 50, the interface block 51, the first and second expander blocks 52, and the first, second, and third spacer blocks 53 reside atop the base 176 at their respective second sides 62, 82, 102, and 122 and abut the back plate 175 at their respective rear surface 60, 80, 100, and 120. The holes 181-188 align, respectively, with the screw holes 75, 76, 115, 116, 95, and 96 such that insertion, respectively, of screws 190-197 connect the bracket 57 with the recirculation block 50, the interface block 51, the first and second expander blocks 52, and the first, second, and third spacer blocks 53, thereby providing additional securing together of the example modular manifold 54. The slots 177-180 align, respectively, with the apertures 72, 112, and 92 at their inlet segments 73, 113, and 93 whereby the slots 177-180 provide access through the bracket 57 to the apertures 72, 112, and 92 for the four inlet conduits 160 connected with the four inlet fittings 56 of the example modular manifold 54. Moreover, the bracket 57 at the slots 177-180 abuts the flanges 158 of the four inlet fittings 56 in order to provide additional securing thereof with the example modular manifold 54. In light of the foregoing description of the bracket 57, one of ordinary skill in the art will recognize that the brackets of the bracket system are sized and include a number and spacing of slots and holes in accordance with the recirculation block 50, the interface block 51, the expander blocks 52, and the spacer blocks 53 comprising the modular manifold 54.

Figure 32:
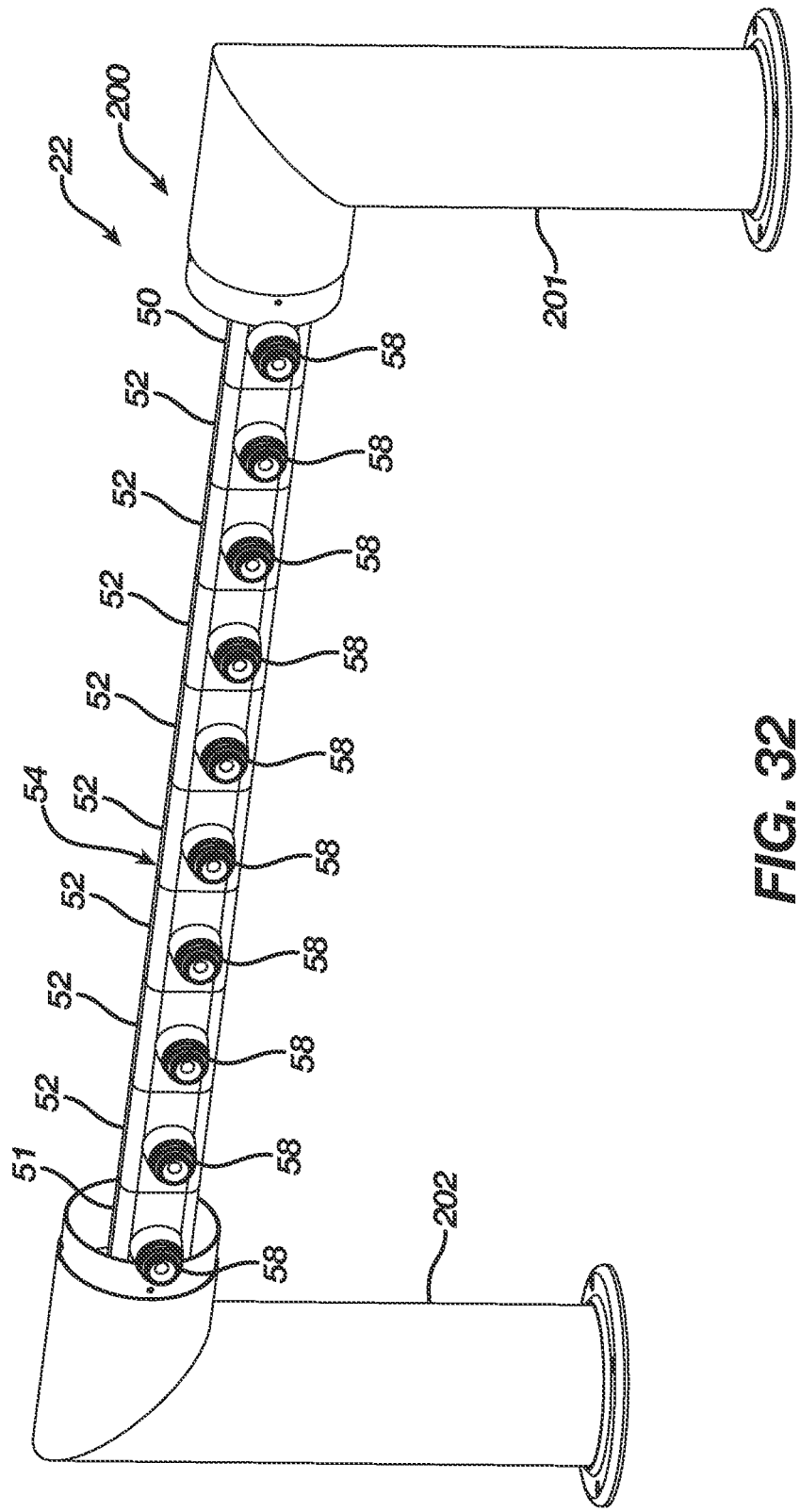
FIGS. 32-34 are isometric views illustrating a dispensing station of the drink dispensing system implementing the cooling system according to a preferred embodiment of the present invention.
Figure 33:
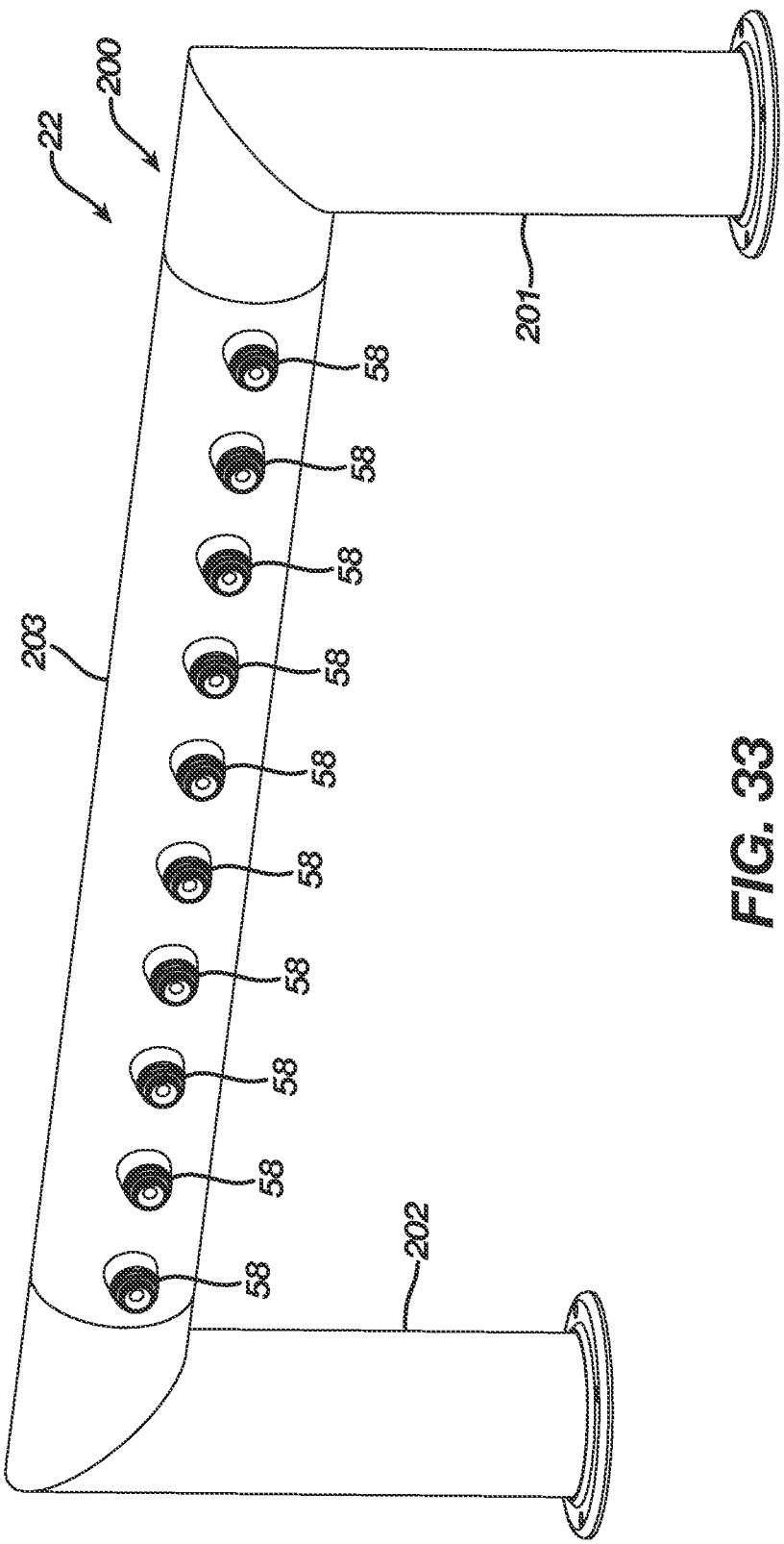
Figure 34:
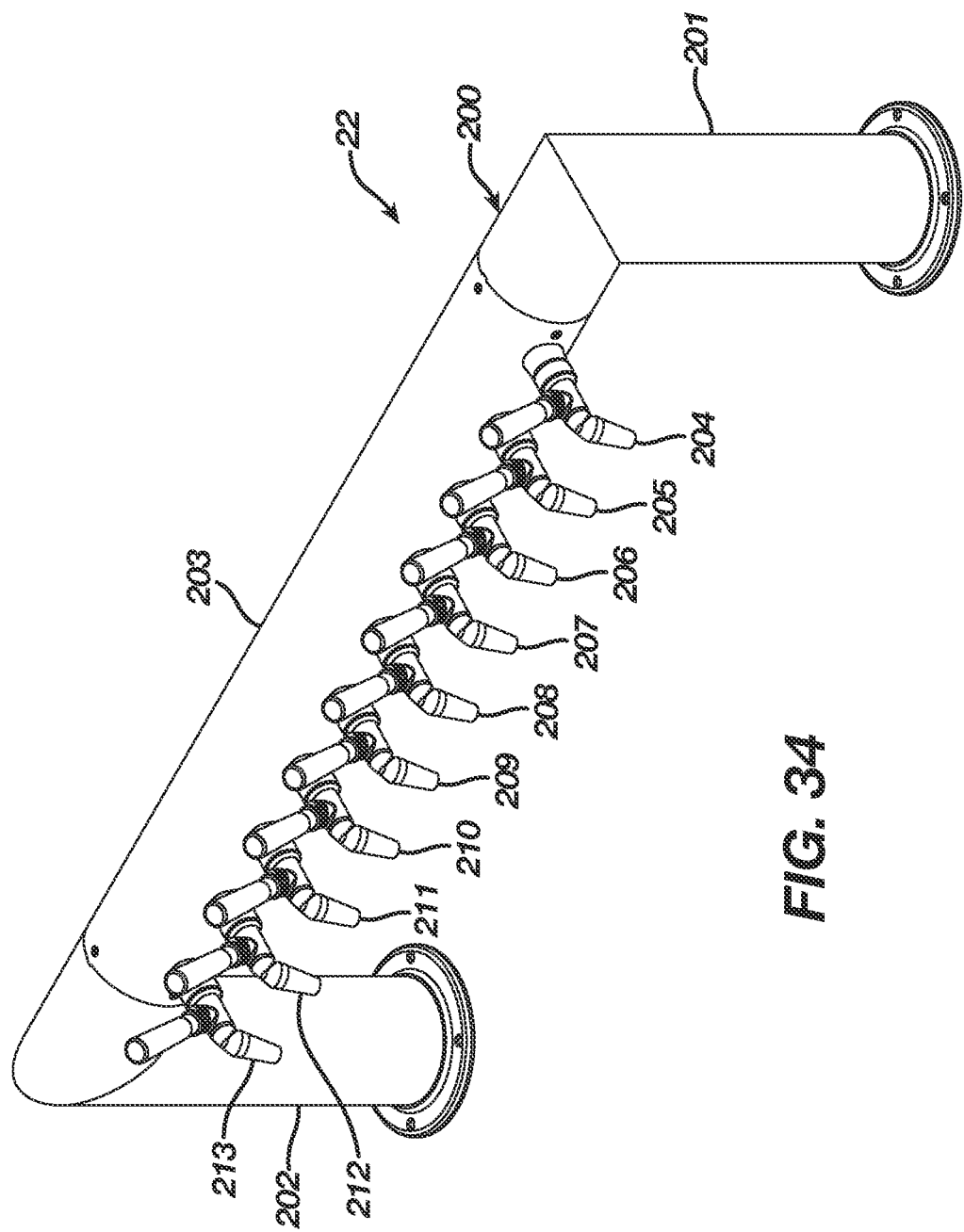

In order to aid in the understanding of the present invention, an example implementation of a dispensing station 22 incorporating a modular manifold 54 will be described herein with reference to FIGS. 32-34. The example dispensing station 22 is a dispensing tower 200 including first and second posts 201 and 202 with a crossbar 203 therebetween. The dispensing tower 200 at its crossbar 203 supports ten drink outlets 23, which, in the example are beer taps 204-213. In light of the dispensing tower 200 including the ten beer taps 204-213, the incorporated modular manifold 54 includes a recirculation block 50 and an interface block 51 with eight expander blocks 52 disposed therebetween in order to provide the incorporated modular manifold 54 with first through tenth inlet fittings 56 and first through tenth outlet fittings 58 whereby the first through tenth outlets fittings 58 register with the ten beer taps 204-213. The incorporated modular manifold 54 may include spacer blocks 53 as needed to register the ten outlets fittings 58 with the ten beer taps 204-213. The incorporated modular manifold 54 further may include a bracket connected therewith in order to provide additional securing together of the incorporated modular manifold 54.

First through tenth drink lines 25, which connect, respectively, with first through tenth beer kegs, run from the first through tenth beer kegs into the dispensing tower 200 via its second post 202. Likewise, the cooling fluid feed line 26 and the cooling fluid return line 27, which connect with the cooling fluid system 21, run from the cooling fluid system 21 into the dispensing tower 200 via its second post 202. The incorporated modular manifold 54 couples, respectively, with the first through tenth drink lines 25 via its first through tenth inlet fittings 56 and their inlet conduits 160. Similarly, the incorporated modular manifold 54 couples, respectively, with the cooling fluid feed line 26 and the cooling fluid return line 27 via its fittings 165 and 166. The incorporated modular manifold 54 further inserts between the first and second posts 201 and 202, while the first and second posts 201 and 202 receive the crossbar 203 therebetween such that the crossbar 203 covers the incorporated modular manifold 54 with its first through tenth outlet fittings 58 extending therefrom. The first through tenth outlet fittings 58 connect, respectively, with the ten beer taps 204-213 whereby the incorporated modular manifold 54 chills and then delivers, respectively, a first through tenth beer from the first through tenth beer kegs to the ten beer taps 204-213 for dispensing therefrom. In view of the foregoing, it should be understood that the modular manifold 54, due to its implementation with recirculation, interface, expander, and spacer blocks 50-53, provides flexibility in producing dispensing stations while reducing manufacturing costs.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

The invention claimed is:

1. A cooling system for a dispensing station, comprising:
a modular manifold adapted for incorporation into the dispensing station, the modular manifold, comprising a recirculation block, an interface block, one or more expander blocks, and one or more spacer blocks adapted for interconnection to produce the modular manifold including therein a recirculation line, comprising a feed line and a return line connected by a recirculation conduit, the recirculation line at the feed line being adapted to couple with a cooling fluid feed line to receive a cooling fluid into the modular manifold from a cooling fluid system and the recirculation line at the return line being adapted to couple with a cooling fluid return line to deliver the cooling fluid from the modular manifold to the cooling fluid system;

the feed line via the cooling fluid feed line receives cooling fluid therein from the cooling fluid system and flows the cooling fluid through the modular manifold and into the recirculation conduit whereby the recirculation conduit redirects the cooling fluid into the return line;

the return line via the recirculation conduit receives the cooling fluid therein whereby the return line flows the cooling fluid back through the modular manifold and into the cooling fluid return line for return to the cooling fluid system; and the modular manifold adapted for coupling with a first drink source and with a first drink outlet of the dispensing station, whereby a first drink flowing through the modular manifold from the first drink source transfers heat to the cooling fluid circulating through the recirculation line resulting in a chilling of the first drink prior to a dispensing thereof from the first drink outlet.

2. The cooling system for a dispensing station of claim 1, wherein the modular manifold adapted for coupling with a second drink source and with a second drink outlet of the dispensing station, whereby a second drink flowing through the modular manifold from the second drink source transfers heat to the cooling fluid circulating through the recirculation line resulting in a chilling of the second drink prior to a dispensing thereof from the second drink outlet.

3. The cooling system for a dispensing station of claim 1, wherein:
  the interface block comprises:
    a feed conduit therethrough including an inlet adapted to couple the feed conduit with the cooling fluid feed line to deliver the cooling fluid into the feed conduit and an outlet, and
    a return conduit therethrough including an inlet and an outlet adapted to couple the return conduit with the cooling fluid return line to deliver the cooling fluid thereto;
  the recirculation block comprises:
    the recirculation conduit including an inlet and an outlet;
  the expander block comprises:
    a feed conduit therethrough including an inlet and an outlet, and
    a return conduit therethrough including an inlet and an outlet; and
  the spacer block comprises:
    a feed conduit therethrough including an inlet and an outlet, and
    a return conduit therethrough including an inlet and an outlet.

4. The cooling system for a dispensing station of claim 3, comprising a plurality of coupling tubes adapted to insert in the inlets and the outlets of the recirculation block, the interface block, the one or more expander blocks, and the one or more spacer blocks, whereby the coupling tubes interconnect the recirculation block, the interface block, the one or more expander blocks, and the one or more spacer blocks such that:
  the feed conduits of the interface block, the one or more expander blocks, and the one or more spacer blocks align to form the feed line of the recirculation line that receives the cooling fluid from the cooling fluid feed line and delivers the cooling fluid into the recirculation conduit of the recirculation block at the inlet thereof whereby the recirculation conduit reverses the cooling fluid, and
  the return conduits of the interface block, the one or more expander blocks, and the one or more spacer blocks align to form the return line of the recirculation line that receives the cooling fluid from the recirculation conduit of the recirculation block at the outlet thereof and returns the cooling fluid to the cooling fluid return line.

5. A cooling system for a dispensing station, comprising:
  a modular manifold adapted for incorporation into the dispensing station, the modular manifold, comprising:
    a recirculation block adapted for coupling with a first drink source and with a first drink outlet of the dispensing station, the recirculation block, comprising a recirculation conduit including an inlet and an outlet,
    an interface block adapted for coupling with a second drink source and with a second drink outlet of the dispensing station, the interface block, comprising a feed conduit therethrough including an inlet and an outlet and a return conduit therethrough including an inlet and an outlet, and
    the recirculation block and the interface block interconnect to produce the modular manifold whereby the feed conduit of the interface block at the outlet thereof communicates with the recirculation conduit of the recirculation block at the inlet thereof and the recirculation conduit of the recirculation block at the outlet thereof communicates with the return conduit of the interface block at the inlet thereof in order to form a recirculation line within the modular manifold adapted to couple with a cooling fluid feed line at the inlet of the feed conduit of the interface block to receive a cooling fluid into the modular manifold from a cooling fluid system and with a cooling fluid return line at the outlet of the return conduit of the interface block to deliver the cooling fluid from the modular manifold to the cooling fluid system;
  the modular manifold whereby a first drink flowing through the modular manifold from the first drink source transfers heat to the cooling fluid circulating through the recirculation line resulting in a chilling of the first drink prior to a dispensing thereof from the first drink outlet; and
  the modular manifold whereby a second drink flowing through the modular manifold from the second drink source transfers heat to the cooling fluid circulating through the recirculation line resulting in a chilling of the second drink prior to a dispensing thereof from the second drink outlet.

6. The cooling system for a dispensing station of claim 5, comprising a plurality of coupling tubes adapted to insert in the inlets and the outlets of the recirculation block and the interface block such that the outlet of the feed conduit of the interface block aligns with the inlet of the recirculation conduit of the recirculation block and the outlet of the recirculation conduit of the recirculation block aligns with the inlet of the return conduit of the interface block to form the recirculation line whereby the feed conduit of the interface block receives the cooling fluid from the cooling fluid feed line and delivers the cooling fluid into the recirculation conduit of the recirculation block further whereby the recirculation conduit reverses the cooling fluid and delivers the cooling fluid into the return conduit of the interface block for return to the cooling fluid return line.

7. The cooling system for a dispensing station of claim 5, wherein:
  the recirculation block includes an aperture therethrough including an inlet segment and an outlet segment;
  an outlet fitting insertable into the aperture of the recirculation block at its outlet segment whereby the outlet fitting is adapted for coupling with the first drink outlet; and
  an inlet fitting insertable into the aperture of the recirculation block at its inlet segment such that the inlet fitting communicates with the outlet fitting, whereby the inlet fitting is adapted for coupling with the first drink source, further whereby the first drink flowing through the inlet fitting and the outlet fitting from the first drink source transfers heat to the cooling fluid circulating through the recirculation conduit of the recirculation block resulting in a chilling of the first drink prior to a dispensing thereof from the first drink outlet.

8. The cooling system for a dispensing station of claim 5, wherein:
the interface block includes an aperture therethrough including an inlet segment and an outlet segment;
an outlet fitting insertable into the aperture of the interface block at its outlet segment whereby the outlet fitting is adapted for coupling with the second drink outlet; and
an inlet fitting insertable into the aperture of the interface block at its inlet segment such that the inlet fitting communicates with the outlet fitting, whereby the inlet fitting is adapted for coupling with the second drink source, further whereby the second drink flowing through the inlet fitting and the outlet fitting from the second drink source transfers heat to the cooling fluid circulating through the feed conduit and the return conduit of the interface block resulting in a chilling of the second drink prior to the dispensing thereof from the second drink outlet.

9. The cooling system for a dispensing station of claim 5, wherein:
the modular manifold, comprising:
an expander block adapted for coupling with a third drink source and with a third drink outlet of the dispensing station, and
the expander block inserts between the recirculation block and the interface block and interconnects therewith whereby the expander block with the recirculation block and the interface block form the recirculation line within the modular manifold; and
the modular manifold whereby a third drink flowing through the modular manifold from the third drink source transfers heat to the cooling fluid circulating through the recirculation line resulting in a chilling of the third drink prior to the dispensing thereof from the third drink outlet.

10. The cooling system for a dispensing station of claim 9, wherein:
the expander block comprises:
a feed conduit therethrough including an inlet and an outlet, and
a return conduit therethrough including an inlet and an outlet.

11. The cooling system for a dispensing station of claim 10, comprising a plurality of coupling tubes adapted to insert in the inlets and the outlets of the recirculation block, the interface block, and the expander block, whereby the coupling tubes interconnect the recirculation block, the interface block, and the expander block such that:
the feed conduits of the interface block and the expander block align to form a feed line of the recirculation line that receives the cooling fluid from the cooling fluid feed line and delivers the cooling fluid into the recirculation conduit of the recirculation block at the inlet thereof whereby the recirculation conduit reverses the cooling fluid, and
the return conduits of the interface block and the expander block align to form a return line of the recirculation line that receives the cooling fluid from the recirculation conduit of the recirculation block at the outlet thereof and returns the cooling fluid to the cooling fluid return line.

12. The cooling system for a dispensing station of claim 11, the modular manifold, comprising a spacer block that inserts between one of the recirculation block and the expander block and the interface block and the expander block and interconnects therewith whereby the spacer block with the recirculation block, the interface block, and the expander block form the recirculation line within the modular manifold.

13. The cooling system for a dispensing station of claim 12, the spacer block, comprising a feed conduit therethrough including an inlet and an outlet and a return conduit therethrough including an inlet and an outlet.

14. The cooling system for a dispensing station of claim 13, comprising a plurality of coupling tubes adapted to insert in the inlets and the outlets of the recirculation block, the interface block, the expander block, and the spacer block, whereby the coupling tubes interconnect the recirculation block, the interface block, the expander block, and the spacer block such that:
the feed conduits of the interface block, the expander block, and the spacer block align to form a feed line of the recirculation line that receives the cooling fluid from the cooling fluid feed line and delivers the cooling fluid into the recirculation conduit of the recirculation block at the inlet thereof whereby the recirculation conduit reverses the cooling fluid, and
the return conduits of the interface block, the expander block, and the spacer block align to form a return line of the recirculation line that receives the cooling fluid from the recirculation conduit of the recirculation block at the outlet thereof and returns the cooling fluid to the cooling fluid return line.

15. The cooling system for a dispensing station of claim 10, wherein:
the expander block includes an aperture therethrough including an inlet segment and an outlet segment;
an outlet fitting insertable into the aperture of the expander block at its outlet segment whereby the outlet fitting is adapted for coupling with the third drink outlet; and
an inlet fitting insertable into the aperture of the expander block at its inlet segment such that the inlet fitting communicates with the outlet fitting, whereby the inlet fitting is adapted for coupling with the third drink source, further whereby the third drink flowing through the inlet fitting and the outlet fitting from the third drink source transfers heat to the cooling fluid circulating through the feed conduit and the return conduit of the expander block resulting in a chilling of the third drink prior to the dispensing thereof from the third drink outlet.

16. The cooling system for a dispensing station of claim 5, the modular manifold, comprising a spacer block that inserts between the recirculation block and the interface block and interconnects therewith whereby the spacer block with the recirculation block and the interface block form the recirculation line within the modular manifold.

17. The cooling system for a dispensing station of claim 16, wherein:
the spacer block comprises:
a feed conduit therethrough including an inlet and an outlet, and
a return conduit therethrough including an inlet and an outlet.

18. The cooling system for a dispensing station of claim 17, comprising a plurality of coupling tubes adapted to insert in the inlets and the outlets of the recirculation block, the interface block, and the spacer block, whereby the coupling tubes interconnect the recirculation block, the interface block, and the spacer block such that:

the feed conduits of the interface block and the spacer block align to form a feed line of the recirculation line that receives the cooling fluid from the cooling fluid feed line and delivers the cooling fluid into the recirculation conduit of the recirculation block at the inlet thereof whereby the recirculation conduit reverses the cooling fluid, and the return conduits of the interface block and the spacer block align to form a return line of the recirculation line that receives the cooling fluid from the recirculation conduit of the recirculation block at the outlet thereof and returns the cooling fluid to the cooling fluid return line.

19. A cooling system for a dispensing station, comprising:

a recirculation block and an interface block adapted for interconnection to produce a modular manifold adapted for incorporation into the dispensing station;

the recirculation block, comprising a recirculation conduit including an inlet and an outlet;

the interface block, comprising:
  a feed conduit therethrough including an inlet adapted to couple the feed conduit with a cooling fluid system to deliver a cooling fluid into the feed conduit and an outlet, and
  a return conduit therethrough including an inlet and an outlet adapted to couple the return conduit with the cooling fluid system to deliver the cooling fluid thereto;

a first coupling tube adapted to insert into the outlet of the feed conduit for the interface block and the inlet of the recirculation conduit for the recirculation block;

a second coupling tube adapted to insert into the inlet of the return conduit for the interface block and the outlet of the recirculation conduit for the recirculation block;

the first and second coupling tubes interconnect the interface block with the recirculation block such that the feed conduit of the interface block delivers the cooling fluid from the cooling fluid system into the recirculation conduit of the recirculation block, whereby the recirculation conduit circulates the cooling fluid through the recirculation block while reversing the cooling fluid for delivery into the return conduit of the interface block for return to the cooling fluid system;

the recirculation block adapted for coupling with a first drink source and a first drink outlet, whereby a first drink flowing through the recirculation block from the first drink source transfers heat to the cooling fluid circulating through the recirculation conduit resulting in a chilling of the first drink prior to a dispensing thereof from the first drink outlet; and the interface block adapted for coupling with a second drink source and a second drink outlet, whereby a second drink flowing through the interface block from the second drink source transfers heat to the cooling fluid circulating through the feed conduit and the return conduit resulting in a chilling of the second drink prior to a dispensing thereof from the second drink outlet.

20. The cooling system for a dispensing station of claim 19, wherein:

the recirculation block includes an aperture therethrough including an inlet segment and an outlet segment;

an outlet fitting insertable into the aperture of the recirculation block at its outlet segment whereby the outlet fitting is adapted for coupling with the first drink outlet; and an inlet fitting insertable into the aperture of the recirculation block at its inlet segment such that the inlet fitting communicates with the outlet fitting, whereby the inlet fitting is adapted for coupling with the first drink source, further whereby the first drink flowing through the inlet fitting and the outlet fitting from the first drink source transfers heat to the cooling fluid circulating through the recirculation conduit of the recirculation block resulting in a chilling of the first drink prior to a dispensing thereof from the first drink outlet.

21. The cooling system for a dispensing station of claim 19, wherein:

the interface block includes an aperture therethrough including an inlet segment and an outlet segment;

an outlet fitting insertable into the aperture of the interface block at its outlet segment whereby the outlet fitting is adapted for coupling with the second drink outlet; and an inlet fitting insertable into the aperture of the interface block at its inlet segment such that the inlet fitting communicates with the outlet fitting, whereby the inlet fitting is adapted for coupling with the second drink source, further whereby the second drink flowing through the inlet fitting and the outlet fitting from the second drink source transfers heat to the cooling fluid circulating through the feed conduit and the return conduit of the interface block resulting in a chilling of the second drink prior to the dispensing thereof from the second drink outlet.

22. The cooling system for a dispensing station of claim 19, comprising a bracket securable with the recirculation block and the interface block, the bracket including a first slot adapted to receive therein the inlet fitting inserted into the aperture of the recirculation block and a second slot adapted to receive therein the inlet fitting inserted into the aperture of the interface block.

23. The cooling system for a dispensing station of claim 19, comprising:

an expander block adapted for interconnection with the recirculation block and the interface block to produce the modular manifold;

the expander block, comprising:
  a feed conduit therethrough including an inlet and an outlet, and
  a return conduit therethrough including an inlet and an outlet;

the first coupling tube adapted to insert into the outlet of the feed conduit of the expander block and the inlet of the recirculation conduit of the recirculation block;

the second coupling tube adapted to insert into the inlet of the return conduit of the expander block and the outlet of the recirculation conduit of the recirculation block;

a third coupling tube adapted to insert into the outlet of the feed conduit of the interface block and the inlet of the feed conduit of the expander block;

a fourth coupling tube adapted to insert into the inlet of the return conduit of the interface block and the outlet of the return conduit of the expander block;

the first, second, third, and fourth coupling tubes interconnect the interface block, the expander block, and the recirculation block such that the feed conduits of the interface block and the expander block deliver the cooling fluid into the recirculation conduit of the recirculation block, whereby the recirculation conduit circulates the cooling fluid through the recirculation block while reversing the cooling fluid for delivery to the return conduits of the expander block and the interface block for return to the cooling fluid system; and the expander block adapted for coupling with a third drink source and a third drink outlet, whereby a third drink flowing through the expander block from the third drink source transfers heat to the cooling fluid circulating through the feed conduit and the return conduit resulting in a chilling of the third drink prior to a dispensing thereof from the third drink outlet.

24. The cooling system for a dispensing station of claim 23, wherein:
the expander block includes an aperture therethrough including an inlet segment and an outlet segment;
an outlet fitting insertable into the aperture of the expander block at its outlet segment whereby the outlet fitting is adapted for coupling with the third drink outlet; and
an inlet fitting insertable into the aperture of the expander block at its inlet segment such that the inlet fitting communicates with the outlet fitting, whereby the inlet fitting is adapted for coupling with the third drink source, further whereby the third drink flowing through the inlet fitting and the outlet fitting from the third drink source transfers heat to the cooling fluid circulating through the feed conduit and the return conduit of the expander block resulting in a chilling of the third drink prior to the dispensing thereof from the third drink outlet.

25. The cooling system for a dispensing station of claim 23, comprising:
a spacer block adapted for interconnection with the expander block, the recirculation block, and the interface block to produce the modular manifold;
the spacer block, comprising:
a feed conduit therethrough including an inlet and an outlet, and
a return conduit therethrough including an inlet and an outlet;
the first coupling tube adapted to insert into the outlet of the feed conduit of the spacer block and the inlet of the recirculation conduit of the recirculation block or the outlet of the feed conduit of the expander block and the inlet of the recirculation conduit of the recirculation block;
the second coupling tube adapted to insert into the inlet of the return conduit of the spacer block and the outlet of the recirculation conduit for the recirculation block or the inlet of the return conduit of the expander block and the outlet of the recirculation conduit of the recirculation block;
the third coupling tube adapted to insert into the outlet of the feed conduit of the expander block and the inlet of the feed conduit of the spacer block or the outlet of the feed conduit of the spacer block and the inlet of the feed conduit of the expander block;
the fourth coupling tube adapted to insert into the inlet of the return conduit of the expander block and the outlet of the return conduit of the spacer block or the inlet of the return conduit of the spacer block and the outlet of the return conduit of the expander block;
a fifth coupling tube adapted to insert into the outlet of the feed conduit of the interface block and the inlet of the feed conduit of the expander block or the outlet of the feed conduit of the interface block and the inlet of the feed conduit of the spacer block;
a sixth coupling tube adapted to insert into the inlet of the return conduit of the interface block and the outlet of the return conduit of the expander block or the inlet of the return conduit of the interface block and the outlet of the return conduit of the spacer block; and
the first, second, third, fourth, fifth, and sixth coupling tubes interconnect the interface block, the expander block, the spacer block, and the recirculation block such that the feed conduits of the interface block, the expander block, and the spacer block deliver the cooling fluid into the recirculation conduit of the recirculation block, whereby the recirculation conduit circulates the cooling fluid through the recirculation block while reversing the cooling fluid for delivery to the return conduits of the interface block, the expander block, and the spacer block for return to the cooling fluid system.

26. The cooling system for a dispensing station of claim 25, wherein:
the feed conduits of the interface block, the expander block, and the spacer block align to form a feed line that receives the cooling fluid from the cooling fluid system and delivers the cooling fluid into the recirculation conduit of the recirculation block whereby the recirculation conduit reverses the cooling fluid, and
the return conduits of the interface block, the expander block, and the spacer block align to form a return line that receives the cooling fluid from the recirculation conduit of the recirculation block and returns the cooling fluid to the cooling fluid system.

27. The cooling system for a dispensing station of claim 25, comprising a bracket securable with the recirculation block, the interface block, the expander block, and the spacer block.

28. A cooling system for a dispensing station, comprising:
a recirculation block adapted for incorporation into the dispensing station while further being adapted for coupling with a cooling fluid system, the recirculation block, including:
an aperture therethrough including an inlet segment and an outlet segment, and
a recirculation conduit comprising a feed conduit including an inlet, a return conduit including an outlet, and a reversing conduit connecting the feed conduit and the return conduit, the recirculation conduit wherein:
the feed conduit at the inlet thereof receives therein a cooling fluid from the cooling fluid system and flows the cooling fluid through the recirculation block and into the reversing conduit, whereby the reversing conduit flows the cooling fluid through the recirculation block while reversing the cooling fluid for delivery into the return conduit, and
the return conduit receives the cooling fluid therein and flows the cooling fluid back through the recirculation block, whereby the return conduit at the outlet thereof returns the cooling fluid to the cooling fluid system;
an outlet fitting insertable into the aperture of the recirculation block at its outlet segment whereby the outlet fitting is adapted for coupling with a first drink outlet; and
an inlet fitting insertable into the aperture of the recirculation block at its inlet segment such that the inlet fitting communicates with the outlet fitting, whereby the inlet fitting is adapted for coupling with a first drink source, further whereby a first drink flowing through the inlet fitting and the outlet fitting from the first drink source transfers heat to the cooling fluid circulating through the recirculation conduit resulting in a chilling of the first drink prior to a dispensing thereof from the first drink outlet.

29. The cooling system for a dispensing station of claim 28, comprising:
- an interface block adapted for interconnection with the recirculation block to produce a modular manifold adapted for incorporation into the dispensing station, the interface block, including:
  - an aperture therethrough including an inlet segment and an outlet segment,
  - a feed conduit therethrough including an inlet adapted to couple the feed conduit with the cooling fluid system to deliver the cooling fluid into the feed conduit and an outlet, and
  - a return conduit therethrough including an inlet and an outlet adapted to couple the return conduit with the cooling fluid system to deliver the cooling fluid thereto;
- a plurality of coupling tubes adapted to insert in the inlets and the outlets of the recirculation block and the interface block such that the outlet of the feed conduit of the interface block aligns with the inlet of the recirculation conduit of the recirculation block and the outlet of the recirculation conduit of the recirculation block aligns with the inlet of the return conduit of the interface block whereby the feed conduit of the interface block receives the cooling fluid from the cooling fluid feed line and delivers the cooling fluid into the recirculation conduit of the recirculation block further whereby the recirculation conduit reverses the cooling fluid and delivers the cooling fluid into the return conduit of the interface block for return to the cooling fluid return line;
- an outlet fitting insertable into the aperture of the interface block at its outlet segment whereby the outlet fitting is adapted for coupling with a second drink outlet; and
- an inlet fitting insertable into the aperture of the interface block at its inlet segment such that the inlet fitting communicates with the outlet fitting, whereby the inlet fitting is adapted for coupling with a second drink source, further whereby a second drink flowing through the inlet fitting and the outlet fitting from the second drink source transfers heat to the cooling fluid circulating through the feed conduit and the return conduit of the interface block resulting in a chilling of the second drink prior to the dispensing thereof from the second drink outlet.

30. The cooling system for a dispensing station of claim 29, comprising:
- an expander block adapted for interconnection with the recirculation block and the interface block to produce the modular manifold, the expander block, including:
  - an aperture therethrough including an inlet segment and an outlet segment,
  - a feed conduit therethrough including an inlet and an outlet, and
  - a return conduit therethrough including an inlet and an outlet;
- the plurality of coupling tubes adapted to insert in the inlets and the outlets of the recirculation block, the interface block, and the expander block, whereby the coupling tubes interconnect the recirculation block, the interface block, and the expander block such that:
  - the feed conduits of the interface block and the expander block align to receive the cooling fluid from the cooling fluid system and deliver the cooling fluid into the recirculation conduit of the recirculation block at the inlet thereof whereby the recirculation conduit reverses the cooling fluid, and
  - the return conduits of the interface block and the expander block align to receive the cooling fluid from the recirculation conduit of the recirculation block at the outlet thereof and return the cooling fluid to the cooling fluid system;
- an outlet fitting insertable into the aperture of the expander block at its outlet segment whereby the outlet fitting is adapted for coupling with a third drink outlet; and
- an inlet fitting insertable into the aperture of the expander block at its inlet segment such that the inlet fitting communicates with the outlet fitting, whereby the inlet fitting is adapted for coupling with a third drink source, further whereby a third drink flowing through the inlet fitting and the outlet fitting from the third drink source transfers heat to the cooling fluid circulating through the feed conduit and the return conduit of the expander block resulting in a chilling of the third drink prior to the dispensing thereof from the third drink outlet.

31. The cooling system for a dispensing station of claim 30, comprising:
- a spacer block adapted for interconnection with the recirculation block, the interface block, and the expander block to produce the modular manifold, the spacer block, including:
  - a feed conduit therethrough including an inlet and an outlet, and
  - a return conduit therethrough including an inlet and an outlet;
- the plurality of coupling tubes adapted to insert in the inlets and the outlets of the recirculation block, the interface block, the expander block, and the spacer block, whereby the coupling tubes interconnect the recirculation block, the interface block, the expander block, and the spacer block such that:
  - the feed conduits of the interface block, the expander block, and spacer block align to receive the cooling fluid from the cooling fluid system and deliver the cooling fluid into the recirculation conduit of the recirculation block at the inlet thereof whereby the recirculation conduit reverses the cooling fluid, and
  - the return conduits of the interface block, the expander block, and the spacer block align to receive the cooling fluid from the recirculation conduit of the recirculation block at the outlet thereof and return the cooling fluid to the cooling fluid system.

* * * * *